AUTOMATIC DOCUMENT SKEW ADJUSTMENT FOR DUPLICATING MACHINES

Filed Nov. 16, 1964 15 Sheets-Sheet 1

INVENTORS
RONALD A. GLASER
GUSTAV FAUST

Strauch, Nolan & Neale
ATTORNEYS

AUTOMATIC DOCUMENT SKEW ADJUSTMENT FOR DUPLICATING MACHINES

Filed Nov. 16, 1964 15 Sheets-Sheet 2

INVENTORS
RONALD A. GLASER
GUSTAV FAUST

BY Strauch, Nolan & Neale
ATTORNEYS

INVENTORS
RONALD A. GLASER
GUSTAV FAUST

Strauch, Nolan & Neale
ATTORNEYS

Sept. 26, 1967 R. A. GLASER ETAL 3,343,450

AUTOMATIC DOCUMENT SKEW ADJUSTMENT FOR DUPLICATING MACHINES

Filed Nov. 16, 1964 15 Sheets-Sheet 4

INVENTORS
RONALD A. GLASER
GUSTAV FAUST

BY Strauch, Nolan & Neale
ATTORNEYS

INVENTORS
RONALD A. GLASER
GUSTAV FAUST

BY Strauch, Nolan & Neale
ATTORNEYS

INVENTORS
RONALD A. GLASER
GUSTAV FAUST

BY Strauch, Nolan & Neale
ATTORNEYS

AUTOMATIC DOCUMENT SKEW ADJUSTMENT FOR DUPLICATING MACHINES

Filed Nov. 16, 1964 15 Sheets-Sheet 7

INVENTORS
RONALD A. GLASER
GUSTAV FAUST

BY Strauch, Nolan & Neale
ATTORNEYS

INVENTOR
RONALD A. GLASER
GUSTAV FAUST

BY Strauch, Nolan & Neale
ATTORNEYS

INVENTOR
RONALD A. GLASER
GUSTAV FAUST

BY Strauch, Nolan & Neale
ATTORNEYS

INVENTOR
RONALD A. GLASER
GUSTAV FAUST

BY Strauch, Nolan & Neale

ATTORNEYS

Sept. 26, 1967 R. A. GLASER ETAL 3,343,450

AUTOMATIC DOCUMENT SKEW ADJUSTMENT FOR DUPLICATING MACHINES

Filed Nov. 16, 1964 15 Sheets-Sheet 11

INVENTOR
RONALD A. GLASER
GUSTAV FAUST

BY Strauch, Nolan & Neale

ATTORNEYS

INVENTOR
RONALD A. GLASER
GUSTAV FAUST

BY Strauch, Nolan & Neale
ATTORNEYS

INVENTOR
RONALD A. GLASER
GUSTAV FAUST

BY Strauch, Nolan & Neale
ATTORNEY

Sept. 26, 1967 R. A. GLASER ET AL 3,343,450

AUTOMATIC DOCUMENT SKEW ADJUSTMENT FOR DUPLICATING MACHINES

Filed Nov. 16, 1964 15 Sheets-Sheet 14

INVENTOR
RONALD A. GLASER
GUSTAV FAUST

BY Strauch, Nolan & Neale

ATTORNEYS

INVENTOR
RONALD A. GLASER
GUSTAV FAUST

BY Strauch, Nolan & Neale
ATTORNEYS 3,343,450
Patented Sept. 26, 1967

3,343,450

AUTOMATIC DOCUMENT SKEW ADJUSTMENT FOR DUPLICATING MACHINES

Ronald A. Glaser, Arlington Heights, and Gustav Faust, Chicago, Ill., assignors to SCM Corporation, New York, N.Y., a corporation of New York Filed Nov. 16, 1964, Ser. No. 411,522
25 Claims. (Cl. 88—24)

This invention relates to multiple copy duplicating machines wherein the original document to be copied is routed through the machine a number of times generally equal to the number of copies desired.

Although this invention will be described in its preferred embodiment as applied to an electrostatic printer, it will be understood by those skilled in the art that it may be applied with equal advantage to numerous other types of duplicating machines.

In office type duplicating machines in wide use today of the type where the original document to be copied is fed into the machine, there are two types of conveying mechanisms for transporting an original through an exposure or imaging station. One type of conveying mechanism comprises a rotatable copy drum or cylinder to which the original document to be copied is releasably clamped in place for rotation therewith. As the copy drum is rotated, the original document thereon passes through an exposure station in timed relationship with the feeding of a sheet of copy paper through the duplicating machine. This type of rotating carrier is described in United States Letters Patent 3,100,112, issued to H. C. Davis et al. on Aug. 6, 1963, entitled, "Document Feed Mechanism."

A second type of conveyor mechanism for transporting an original document to be copied through an exposure or imaging station incorporates power driven guides, such as, for example, belts or rollers, which transport the original document along a continuous path passing through the exposure station. A duplicating machine incorporating this second type of conveyor mechanism is described in United States Letters Patent 3,091,169, issued to J. Taini et al. on Mar. 28, 1963, and entitled "Automatic Photoprinting Machine." Another duplicating machine incorporating the second type of conveyor mechanism is disclosed in copending United States application Ser. No. 366,268, of A. S. Zerfahs et al., filed May 11, 1964, entitled, "Automatic Photocopying Apparatus."

In this latter type of apparatus, it has been found that generally the original document cannot be recycled indefinitely for the principal reason that small variations in the dimensions of the paper guide parts, such as the diameters of the rollers, resulting from unavoidable manufacturing tolerances, contribute to the causes that make the traveling document turn or to become skewed. After recycling the original up to about 10 times, it must be removed and re-inserted in those situations where additional copies are desired.

Accordingly, it is a principal object of this invention to provide an improved multiple copy duplicating machine which has means for determining when the original document becomes skewed relative to its desired position, and means responsive to such determination for taking corrective action which may, for example, be to correct the skew and/or to cause the original to be ejected to enable it to be re-inserted properly.

More particularly, it is the object of this invention to provide a duplicating machine with a novel means for automatically adjusting the skew of the original document to be copied as the document is recycled in producing multiple copies.

Another primary object of this invention is to provide a duplicating machine with a novel means for automatically ejecting the traveling document from its endless, multiple copy producing path upon the sensing of a predetermined angle of document skew.

A more specific object of this invention is to provide a novel duplicating machine having an endless path through which the document to be copied is routed for producing multiple copies, a detecting device for sensing the angle of skew of the document traveling in its endless path, and a document engaging deflector surface movable to adjust the skew of the document upon the sensing of a predetermined angle of skew by the detecting device.

Still another object of this invention is to provide a duplicating machine with an endless path through which the document to be copied is cyclically routed for producing multiple copies and with a novel document orienting and ejecting construction whereby the document is ejected from its endless path if the operator objectionably skews the document as he feeds it into the printer and whereby the skew imparted to a properly fed document by the document engaging parts of the apparatus is automatically adjusted to prevent the skew of the document from exceeding a predetermined angle as it is recycled along its endless path.

Another principal object of this invention resides in providing a skew correction circuit which operates only when the skew of the document is in one direction and does not operate when the document skew is in the other direction. An important advantage of such an arrangement is that the correcting apparatus, such as a reflector guiding the movement of the document, needs only to operate between two positions, one the normal non-operated condition and the other the operated condition in response to the detection of the skewed condition of the document in the direction where the correction is to be made. In such embodiment, the document feed path is purposely made to provide a predetermined small amount of skew in said one direction so that each time the document is routed so as to recycle automatically through the document travel path, the document becomes slightly more skewed in this direction. Thus, for documents that are inserted to have a skew in the opposite direction, no correction is required since with each successive recycling of the document, the skew decreases toward zero and then begins to increase in said one direction. At this point, the skew detection circuit of the present invention becomes operative to adjust some component of a document feed path, such for example as a deflector surface, and thus introduce a comparatively larger amount of skew and in a direction opposite to the direction of skew that is built into the system so that the document will recycle two or three times before becoming skewed sufficiently in said one direction as to cause energization of the skew detection circuit.

Accordingly, a further major object of the present invention is to provide a novel skew correction circuit of simplified construction and one which is movable between only two positions.

A yet further object resides in providing novel electronic circuits employing a controlled rectifier for actuating the means in the document feed path which imparts a special movement to the document, i.e., either ejects it from the endless path or reduces the amount of skew, in response to detection of an undesirable skewed orientation of the document.

Further objects of the invention will presently appear as the description proceeds in connection with the appended claims and the annexed drawings wherein:

FIGURE 19 (on sheet 8) is a section similar to FIGURE 14 and illustrating a modified form of a rear turn around guide assembly which may be incorporated in the printer of FIGURE 1 when the circuit shown in FIGURE 18 is employed;

Figure 1:
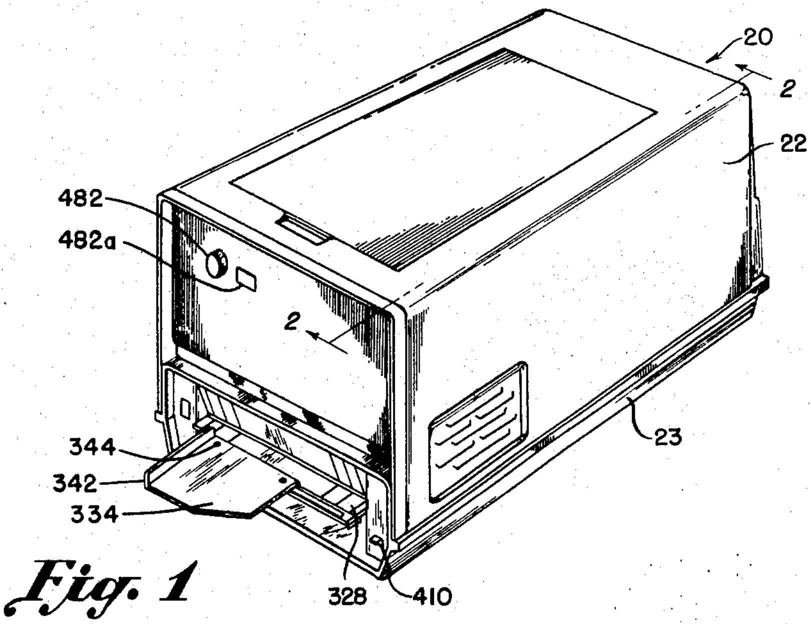
FIGURE 1 is a perspective view of the electrostatic printer of this invention as seen from the front, right-hand corner.
Figure 2:
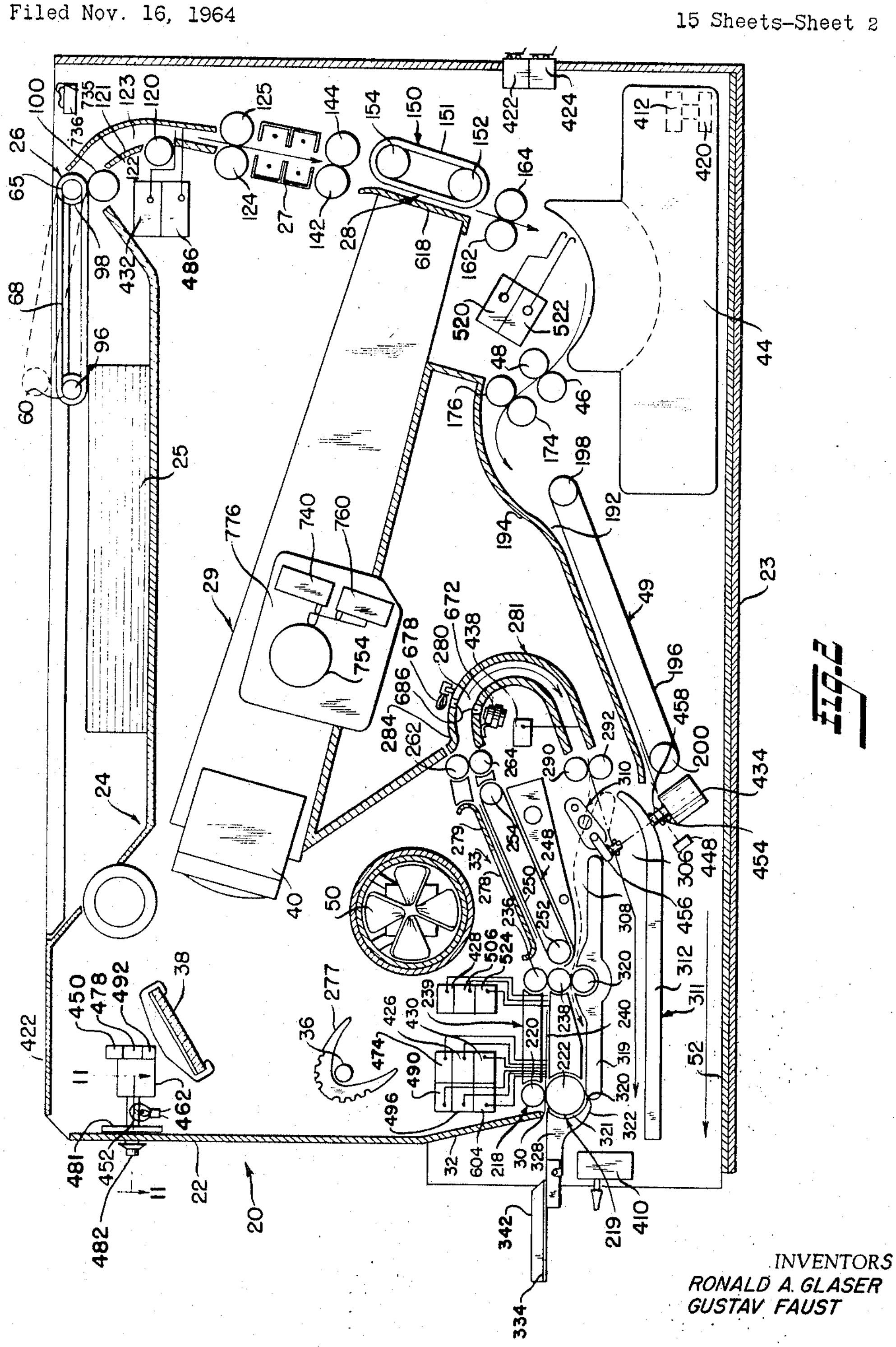
FIGURE 2 is a partially schematic longitudinal sectional view taken substantially along lines 2—2 of FIGURE 1.

Referring now to the drawings, and more particularly to FIGURES 1 and 2, the reference numeral 20 generally designates an electrostatic printing machine comprising a casing 22 removably mounted on a rigid frame 23 Preferably, casing 22 is slidably mounted on suitable upstanding tracks (not shown) so that it may be raised clear of frame 23 and the structure supported thereon.

Arranged within casing 22 is a copy paper supply compartment 24 comprising a shallow sheet metal tray into which photoconductive paper may be loaded in a stack 25. A paper feed mechanism generally indicated at 26 removes sheets of the copy paper from stack 25 in compartment 24 and transports them one at a time through a corona charging unit 27 where a uniform charge of approximately —400 volts is applied to the surface of the copy paper. From charging unit 27, each sheet of copy paper is fed through an imaging station 28 located adjacent the lower end of an imaging projector 29.

The original document to be copied may be manually inserted through a horizontal slot 30 provided in a panel 32 which forms the front wall of casing 22. The document fed through slot 30 is conveyed through an imaging station 33 by means to be described later on. The copy paper is advanced through its imaging station 28 synchronously and in timed relation to the movement of the document through station 33.

Imaging station 33, as shown in FIGURE 2, is located below the forward end of image projector 29. Light is focused on imaging station 33 as by a pair of projection lamps 36 and 37 (FIGURE 3), and an image is reflected from the surface of the original document into an objective lens 40 of projector 29 by a mirror 38. Lens 40 projects the reflected image onto the surface of the sheet of copy paper passing through its imaging station 28. As the image strikes the copy paper, the charge on the paper is reduced by an amount determined by the intensity of the reflected light. The black portions of the original will reflect such a relatively small light intensity as to affect the charge very little, while the light portions of the original will reflect sufficient light intensity as to almost completely release the latent electrostatic charge on the copy paper as is well known in the art.

With continued reference to FIGURE 2, the exposed copy sheet containing the latent charge pattern is developed to provide a visible image as by being passed through a developing tank 44. A liquid developer contained in tank 44 and having charged particles is applied to the latent image bearing surface of the copy paper. These charged particles, which may have a positive polarity, are attracted to negatively charged areas on the copy sheet to a degree determined by the charge at each region on the surface on the copy paper, thereby producing a graphic image. The copy paper feed mechanism then moves the developed copy paper between squeegee rollers 46 and 48 which remove the excess developer from the copy paper and which, if desired, may provide a direct voltage of relatively low magnitude to control the density of the image and/or the cleanliness of the background of the developed copy paper.

The radiant heat of projection lamps 36 and 37 together with the air warmed by lamps 36 and 37 blown across the copy paper by fans indicated at 50 are effective to remove substantially all of the moisture from the surface of the copy paper. Thereafter, the developed copy paper is discharged by a conveyor 49 onto a tray surface 52 located near the bottom of printer 20 adjacent to panel 32. The sheets of copy paper deposited on surface 52 may be removed by an operator through an opening in panel 32.

Figure 3:
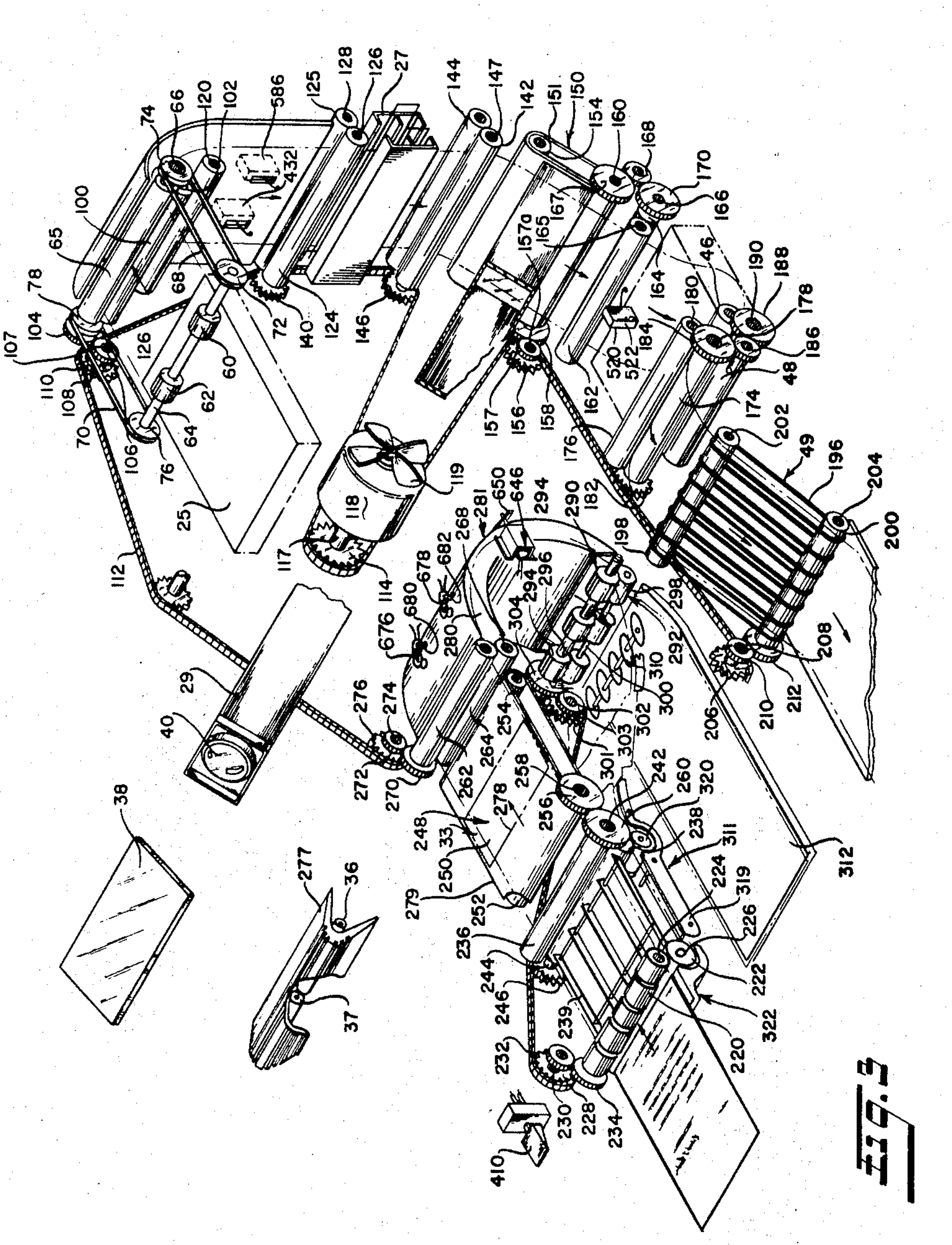
FIGURE 3 is a partially exploded perspective view as seen from the front, right corner of the printer of FIGURE 1 with the casing removed.

With reference now to FIGURES 2 and 3, paper feed 26 may comprise a pair of axially aligned, spaced apart feed rollers 60 and 62 fixed on a shaft 64. Rearwardly of shaft 64 is a feed roller 65 which is fixed on a shaft 66. Shaft 66 is rotatably mounted by unshown bearings on frame 23 in parallel spaced apart relationship to shaft 64 and is drivingly connected thereto by suitable belts 68 and 70. As described in greater detail in said copending application Ser. No. 249,248, shaft 64 is rotatably mounted by suitable bearings (not shown) on a bracket (not shown) which is rockable about the axis of shaft 66, thereby permitting feed rollers 60 and 62 to be swung upwardly to the dotted line position shown in FIGURE 2 for loading copy paper into compartment 24.

As best shown in FIGURE 3, belt 68 extends around pulleys 72 and 74 which are respectively fixed to corresponding ends of shafts 64 and 66. Similarly, belt 70 extends around pulleys 76 and 78 which are respectively fixed to corresponding ends of shafts 64 and 66 on the opposite side from belt 68. With this construction, feed rollers 60 and 62 are driven by shaft 66 through belts 68 and 70. The weight of shaft 64 together with rollers 60 and 62 and pulleys 72 and 76 is sufficient to provide the necessary friction on the upper surface of the copy paper stack 25 to cause the upper sheet is stack 25 to be advanced when shaft 64 is rotated.

With continued reference to FIGURE 3, feed roller 65 frictionally drives a mating feed roller 100 fixed on a shaft 102 to move the copy paper through the printer. Shaft 102 is rotatably mounted by bearings (not shown) in parallel spaced apart relation vertically below shaft 66. Roller 100 is driven by frictional engagement with roller 65.

As best shown in FIGURE 3, a pair of intermeshing spur gears 104 and 106 are respectively fixed on shaft 66 and a rotatably mounted shaft 107. Spur gear 106 comprises the output member of an electromagnetic clutch 108 which is supported in any suitable manner on frame 23. The input member of clutch 108 comprises a sprocket wheel 110 about which an endless roller drive chain 112 is trained.

With continued reference to FIGURE 3, chain 112 is trained around and driven by a sprocket wheel 114 which is fixed on an output shaft 117 of an electric drive motor 118. As will presently become apparent as the description proceeds, motor 118 is continuously energized when printer 20 is in operation. As a result, when clutch 108 is energized, a driven train is established for transmitting power from motor 118 through drive chain 112, clutch 108, and spur gears 104 and 106 to rotate shaft 66. By rotating shaft 66, torque is transmitted by belts 68 and 70 to rotate shaft 64 with the result that rollers 60 and 62 are revolved in a counterclockwise direction as viewed from FIGURE 2 to advance the top sheet of copy paper in stack 25 toward rollers 65 and 100. As a result of rotating shaft 66, rollers 65 and 100 are revolved in opposite directions for advancing the sheet of copy paper fed from compartment 24 by rollers 60 and 62.

Motor 118 may be mounted by any suitable means (not shown) on frame 23. A fan 119 driven by motor 118 is operative to circulate air through casing 22.

With continued reference to FIGURES 2 and 3, the copy paper advanced by rollers 65 and 100 passes over a rotatably mounted idler roller 120 and between fixed spaced apart deflecting guides 121 and 122 which form a throat 123. The sheet of copy paper advanced by rollers 65 and 100 are turned by guides 122 and 121 to descend downwardly. Idler roller 120 assists the copy paper in moving freely through throat 123 to a pair of pick-up rollers 124 and 125.

With continued reference to FIGURES 2 and 3, pick-up rollers 124 and 125 are respectively fixedly mounted on parallel shafts 126 and 128 which are rotatably supported in bearings (not shown) below throat 123. Fixed to one end of shaft 126 is a sprocket wheel 140 which is engaged by drive chain 112 to continuously rotate pick-up roller 124. Roller 125 is driven by frictional engagement with roller 124.

The copy paper fed through throat 123 is advanced downwardly by pick-up rollers 124 and 125 for transportation through corona unit 27. Below corona unit 27 is a further pair of parallel, rotatable pick-up rollers 142 and 144. Roller 142 is revolved by drive chain 112 which engages a sprocket wheel 146 fixed on one end of a rotatably mounted shaft 147. Roller 142 is mounted on shaft 147 and frictionally drives roller 144.

With continued reference to FIGURES 2 and 3, the copy paper passing through corona unit 27 is advanced by pick-up rollers 142 and 144 to a conveyor 150 which comprises an endless conveyor belt 151 trained around rotatably supported, parallel, spaced apart drive and driven rollers 152 and 154. Belt 151 advances the copy paper through imaging station 28 and maintains the copy paper flat while the image of the original document is projected on it by image projector 29.

As best shown in FIGURE 3, conveyor 150 is continuously driven by chain 112 which is trained over a sprocket wheel 156. A gear 157 fixed on a shaft 157*a* mounting sprocket wheel 156 constantly meshes with another gear 158 fixed on the end of a rotatably mounted shaft 160. Roller 152 is mounted on shaft 160 and is revolved by drive chain 112 through the drive train formed by gears 157 and 158.

With continued reference to FIGURES 2 and 3, conveyor 150 guides the copy paper to a further pair of pick-up rollers 162 and 164 respectively fixed on shafts 165 and 166 below roller 152. To continuously revolve roller 164, a spur gear 167 fixedly mounted on one end of shaft 160 meshes with a rotatably supported idler gear 168 which, in turn, meshes with a gear 170. Gear 170 is fixed on one end of shaft 166 to impart rotation to roller 164. Roller 164 is continuously driven by frictional engagement with roller 162.

Pick-up rollers 162 and 164 feed the copy paper downwardly into developing tank 44. As the copy paper leaves developing tank 44, it is picked up and passed through squeegee rollers 46 and 48 which are rotatably supported on frame 23 by suitable bearings (not shown).

From squeegee rollers 46 and 48, the copy paper is advanced between a further pair of pick-up rollers 174 and 176 which are respectively mounted on shafts 178 and 180. Roller 174 is continuously driven by chain 112 which is trained over a sprocket wheel 182 fixed on one end of shaft 178. Roller 176 is driven by frictional engagement with roller 174. A drive train comprising a spur gear 184 fixed on shaft 178 constantly meshes with a rotatably mounted idler gear 186 which, in turn, constantly meshes with a gear 188. Gear 188 is fixed on one end of a shaft 190 which mounts squeegee roller 48. Squeegee roller 48 is thus rotated through this drive train and drives roller 46 by frictional engagement therewith.

With continuing reference to FIGURES 2 and 3, the copy paper is advanced by rollers 174 and 176 into a throat 192 defined by conveyor 49 and a fixed metal guide 194. Conveyor 49 comprises a series of endless cords 196 trained around parallel spaced apart rollers 198 and 200 which are respectively fixed on shafts 202 and 204. Conveyor 49 is driven by chain 112 which is trained over a sprocket wheel 206. Sprocket wheel 206 is fixed to a shaft 208 which is rotatably supported on frame 23 in any suitable manner. A gear 210 fixed on shaft 208 constantly meshes with a gear 212 fixed on shaft 204 so that movement of drive chain 112 imparts rotation to roller 200 to advance cords 196.

As previously described, the copy paper is advanced by conveyor 49 downwardly and forwardly onto tray surface 52 for removal by the operator of the printer. Thus, from the foregoing, it is apparent that the copy paper feed mechanism previously described withdraws a sheet of copy paper from paper supply compartment 24, feeds the sheet of copy paper through corona unit 27 where a uniform charge of approximately −400 volts is imparted to its surface, advances the copy paper through imaging station 28, and then transfers the copy paper to the developing tank 44 from which the copy paper is removed and deposited on surface 52 for removal from the printer.

Figure 5:
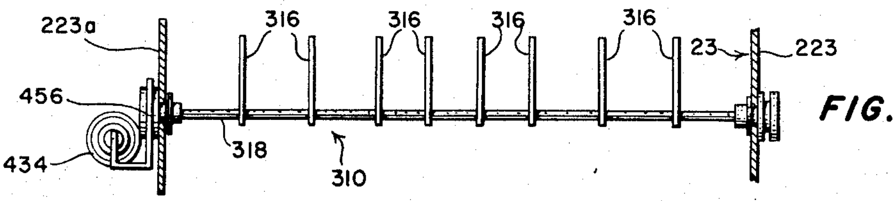
FIGURE 5 is a section taken substantially along lines 5—5 of FIGURE 6.
Figure 6:
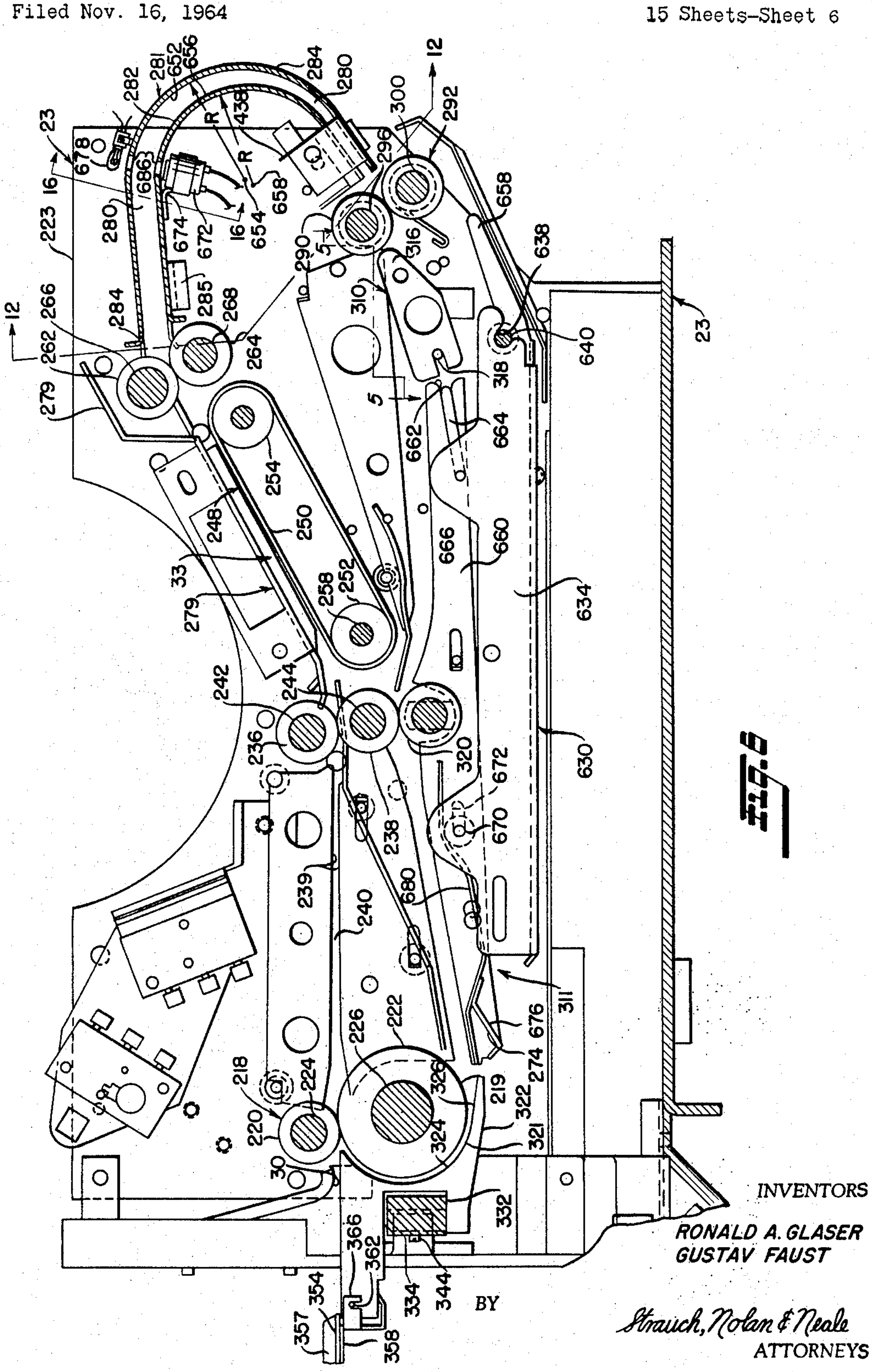
FIGURE 6 is a section taken substantially along lines 6—6 of FIGURE 4.

Referring now to FIGURES 2, 3, and 6 the original document which is inserted through slot 30 for transportation through imaging station 33 is fed between a pair of pick-up roller assemblies 218 and 219 respectively comprising a series of axially spaced apart rollers 220 and 222 extending between parallel, upstanding, spaced apart side panels 223 and 223*a* (FIGURE 5) forming a part of frame 23. Rollers 220 and 222 are respectively fixed on parallel shafts 224 and 226 which are mounted by suitable bearings (not shown) on frame 23. Rollers 220 are driven by chain 112 which is trained over a sprocket wheel 228. Sprocket wheel 228 is fixed on a shaft 230 supported on frame 23 by suitable bearings (not shown). A gear 232 fixed on shaft 230 constantly meshes with a gear 234 which is fixed on one end of shaft 224. Advancement of drive chain 112 thus imparts continuous rotation to rollers 220 through the drive train formed by wheel 228 and gears 232 and 234.

Rollers 222 are driven by frictional engagement with rollers 220 so that the document to be copied is advanced by rollers 220 and 222 horizontally toward a further pair of pick-up rollers 236 and 238 which are parallel to rollers 220 and 222 and which are separated from rollers 220 and 222 by a metal guide structure 239 suitably fixed in place on frame 23 and defining a document guide path 240 (FIGURE 2) extending horizontally between rollers 220 and 222 and rollers 236 and 238. Pick-up rollers 236 and 238 are respectively fixed on parallel shafts 242 and 244 which are rotatably mounted by suitable bearings (not shown) on frame 23. Rollers 238 is continuously rotated by drive chain 112 which is trained over a sprocket wheel 246 fixed on one end of shaft 244. Roller 236, which is mounted vertically above roller 238, is rotated by frictional engagement with roller 238.

Pick-up rollers 236 and 238 feed the document to be copied onto a conveyor 248 which comprises an endless belt 250 trained around parallel, spaced apart rollers 252 and 254. Belt 250 supports the document to be copied as it passes through imaging station 33 below the forward upper end of image projector 29.

As best shown in FIGURE 3, roller 252 is fixedly mounted on a shaft 258 which is rotatably supported by suitable bearings (not shown) on frame 23. A spur gear 256 fixed on one end of shaft 258 constantly meshes with a spur gear 260 fixed on shaft 242 with the result that advancement of chain 112 continuously rotates roller 252 to drive belt 250. The rearward movement of the document on conveyor belt 250 is synchronized with the movement of the copy sheet on conveyor belt 151 by drive chain 112, and the movement of the copy sheet is coordinated by use of feeler switches contained in a control circuit to be described later on.

As the document travels off the rear end of belt 250, it passes between a further pair of pick-up rollers 262 and 264 respectively fixed on parallel shafts 266 and 268 which are rotatably mounted by suitable bearings (not shown) on frame 23. Pick-up roller 262 is driven by a gear 270 fixed on one end of shaft 266 and constantly meshing with a gear 272. Gear 272 is fixed on a shaft 274 which is rotatably mounted on frame 23 and which mounts a sprocket wheel 276. Drive chain 112 is trained over sprocket wheel 276 to continuously revolve roller 262 when motor 118 is energized. Roller 264, which is vertically below roller 262, is driven by frictional engagement with roller 262.

The document conveyed through imaging station 33 is illuminated by projection lamps 36 and 37 which, as shown in FIGURES 2 and 3, may be mounted in a suitable parabolic reflector 277 fixedly supported on frame 23 in such manner as to provide the necessary amount of illumination of the document. The light from projection lamps 36 and 37 is directed through a slot 278 formed in a sheet metal member 279 supported on frame 23 closely adjacent and parallel to the upper run of conveyor belt 250. The image on the document to be copied, as previously explained, is reflected from its surface to mirror 38 which is supported at an upwardly and rearwardly inclined angle adjacent the forward end of casing 22.

Figure 15:
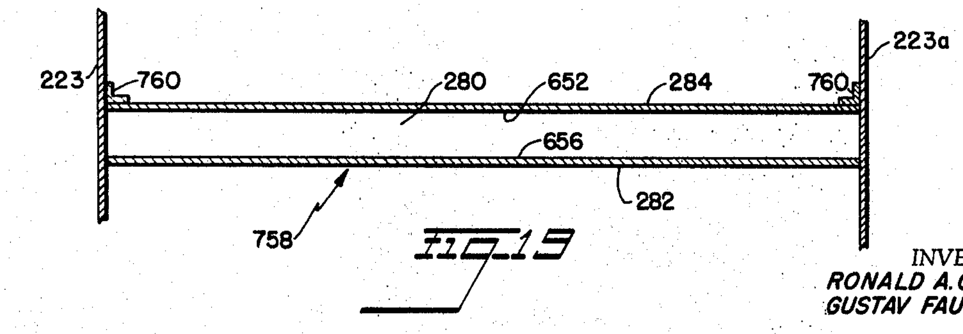
FIGURE 15 is a view similar to that of FIGURE 14 but showing the rear turn around guide in its forwardly canted, document skew correcting position when the solenoid is energized.

With continuing reference to FIGURES 2, 3, and 6, the document fed through imaging station 33 is advanced by rollers 262 and 264 into a throat 280 formed by a rear turn around assembly 281. Assembly 281 comprises forward and rearward rigid, arcuate guides 282 and 284 each comprising rigid, curved metal plates having smooth, opposed faces delimiting throat 280. Guide 282 is fixed at opposite sides to panels 223 and 223*a* by suitable brackets 285 (FIGURE 15). Guide 284 is spaced rearwardly from guide 282 and is rockably mounted to vary the spacing between the opposed document guide surfaces delimiting throat 280 in a manner and for a purpose to be explained later on in detail. As shown, assembly 281 deflects the rearwardly moving document into a path traveling toward the front of printer 20.

With continued reference to FIGURES 2, 3, and 6, the copied document is withdrawn from throat 280 by a pair of pick-up roller assemblies 290 and 292. Roller assembly 290 comprises a series of axially aligned, spaced apart feed rollers 294 mounted on a common shaft 296 which is rotatably mounted on frame 23 by suitable bearings (not shown). Roller assembly 292 disposed vertically below roller assembly 290 similarly comprises a series of axially aligned, spaced apart feed rollers 298 fixed on a common shaft 300 which is mounted by suitable bearings (not shown) on frame 23 in parallel relationship with shaft 296.

As best shown in FIGURE 3, rollers 294 are revolved by drive chain 112 which is trained around a sprocket wheel 301 fixed on a rotatably mounted shaft 302. A gear 303 fixed on shaft 302 constantly meshes with a further gear 304 fixedly mounted on one end of shaft 296. Rollers 294 are thus driven by chain 112 through the drive train formed by wheel 301 and gears 303 and 304. Rollers 298 are driven by frictional engagement with rollers 294.

As shown in FIGURE 2, the copied document advanced toward the front of printer 20 by roller assemblies 290 and 292 is transferred either into an ejection path 306 or into a recycling path 308 by a gate or flipper 310. Paths 306 and 308 are defined by a removable guide structure 311 which is described in detail in the aforesaid copending application Ser. No. 366,268. The document routed through path 308, as will be explained in greater detail below, is recycled through imaging station 33 for producing multiple copies. The document routed through ejection path 306 is deposited on a tray 312 for removal from printer 20 by the operator. Tray 312 preferably forms a part of guide structure 311.

As best shown in FIGURES 3 and 5 flipper 310 may comprise a series of thin, flat sided metal fingers 316 which are fixedly mounted in parallel uniformly axially spaced apart relationship on a common shaft 318. Shaft 318 is rotatably supported by suitable bearings on frame 23 and may either be manually or automatically rotated by means to be described later on to position fingers 316 either in their full line positions or their dotted line positions as shown in FIGURE 2.

Fingers 316 extend from shaft 318 toward the rearward end of printer 20 and terminate closely adjacent to roller assemblies 290 and 292. Shaft 318 is spring biased to position fingers 316 in their full line positions where they are located immediately above the exit throat from roller assemblies 290 and 292. In this position of fingers 316, the document advanced between rollers 294 and 298 is guided under fingers 316 and into ejection path 306 for deposit on tray 312. When fingers 316 are positioned in their dotted line positions, the document advanced by roller assemblies 290 and 292 is guided over fingers 316 and into the recycling path 308.

As generally shown in FIGURES 2, 3, and 6, guide structure 311 is formed with a feed back shelf 319 which guides the original document along path 308 for recycling through imaging station 33. A document routed by flipper 310 into path 308 is fed by roller assemblies 290 and 292 between roller 238 and a further pick-up roller 320. Roller 320 is driven by frictional engagement with roller 238 and is rotatably mounted vertically below and in parallel relation with roller 238.

With continued reference to FIGURES 2, 3, and 6, a throat 321 is defined by roller 222 and a front turn around guide 322. Guide 322 deflects the forwardly traveling document by turning it upwardly and rearwardly to reverse its direction by approximately 180 degrees and route it into the throat between rollers 220 and 222 where the document again is advanced along path 240 and through imaging station 33. The recycled document thus advanced by rollers 220 and 222 is picked up again by rollers 236 and 238 which feed the document to conveyor 248 for transportation through imaging station 33. In this manner the document may be recycled through imaging station 33 as many times as desired by maintaining flipper 310 in its dotted line position shown in FIGURE 2.

Figure 8:
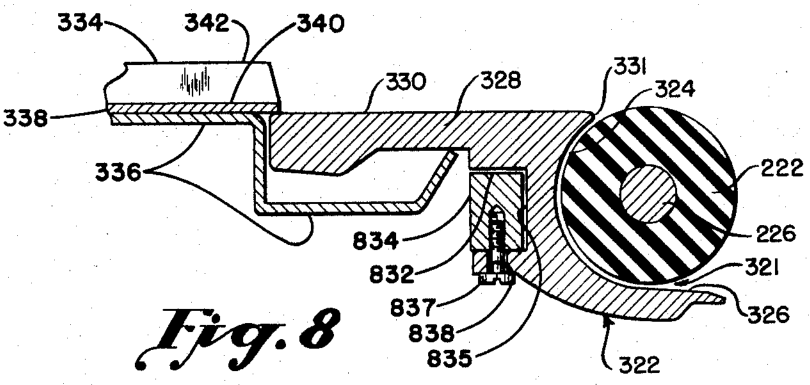
FIGURE 8 (on sheet 1) is a section taken substantially along lines 8—8 of FIGURE 4.

As best shown in FIGURE 8, guide 322 comprises a one piece metal member having an arcuate deflector surface 324 facing and being coextensive with rollers 222 to delimit throat 321. The radius of curvature of surface 324 has a center which is nearly coincident with the center of rollers 222. At its lower end, surface 324 merges with a straight substantially horizontally extending lip 326 which is vertically below and spaced from rollers 222 and which initially engages the document to guide it smoothly into throat 321. Deflecting surface 324 extends with a substantially uniform radius of curvature over an arc that is somewhat less than 180° and terminates at its upper end forwardly of rollers 222.

With continued reference to FIGURES 6 and 8, guide 322 is formed with a document feed shelf portion 328 having a flat horizontal top surface 330 extending forwardly from the upper end of deflecting surface 324 to define a rearwardly facing edge 331. Feed shelf portion 328, as best shown in FIGURES 2 and 6, extends through slot 30 in front panel 32 of casing 22. Preferably, guide 322 is adjustably mounted on frame 23 in a manner and for a purpose to be described later on in detail.

As shown in FIGURES 1 and 2, a document feed shelf 334 is adjustably mounted on a rigid metal bracket 336 which is detachably supported from guide 322 in a manner described in detail in the aforesaid copending application Ser. No. 366,268. Shelf 334 extends horizontally forwardly from slot 30 and has its rearward marginal edge seated on surface 330 of shelf portion 328.

With continued reference to FIGURES 1 and 8, feed shelf 334 is formed with a flat plate portion 338 having a document support surface 340. Plate portion 338, as viewed from FIGURE 1, is bent upwardly along its left-hand marginal edge to provide an upstanding guide wall 342 which extends at right angles to surface 340. In feeding a document to be copied into printer 20, the operator slides the document along surface 340 with one side edge of the document bearing against guide wall 342 to align the document relative to the rotational axes of rollers 220 and 222. In this manner, feed shelf 334 serves as a square gauge or fence to permit the operator of printer 20 to properly align the document to be copied as he feeds it through slot 30.

As fully described in the aforesaid copending application Ser. No. 366,268, feed shelf 334 is selectively rockable about a pivot post 344 (FIGURE 1) to adjust the angle at which guide wall 342 extends with respect to the rotational axes of rollers 220 and 222. This adjustment permits feed shelf 334 to be swung to a position where guide wall 342 is substantially at right angles to the rotational axes of rollers 220 and 222. In addition, feed shelf 334 is slidably adjustable along a path extending essentially parallel to the rotational axes of feed rollers 220 and 222 as described in detail in the aforesaid copending application Ser. No. 366,268. This adjustment assures that the document to be fed through slot 30 is substantially centered between the ends of roller assemblies 218 and 219.

Feed shelf 334 thus provides the operator of printer 20 with a guide for uniformly feeding documents to be copied at a predetermined angle relative to the rotational axes of rollers 220 and 222 to thereby keep the operator from accidentally skewing the documents at varying, haphazard angles as he feeds the documents through slot 30 in casing 22. By feeding documents to be copied into printer 20 at the same angle relative to the rotational axes of rollers 220 and 222, the angle at which each document is skewed by the degradation of the document guide structure will be constant and determinable to more readily effectuate accurate adjustment of the orientation of the document in a manner to be described in detail later on.

Figure 9:
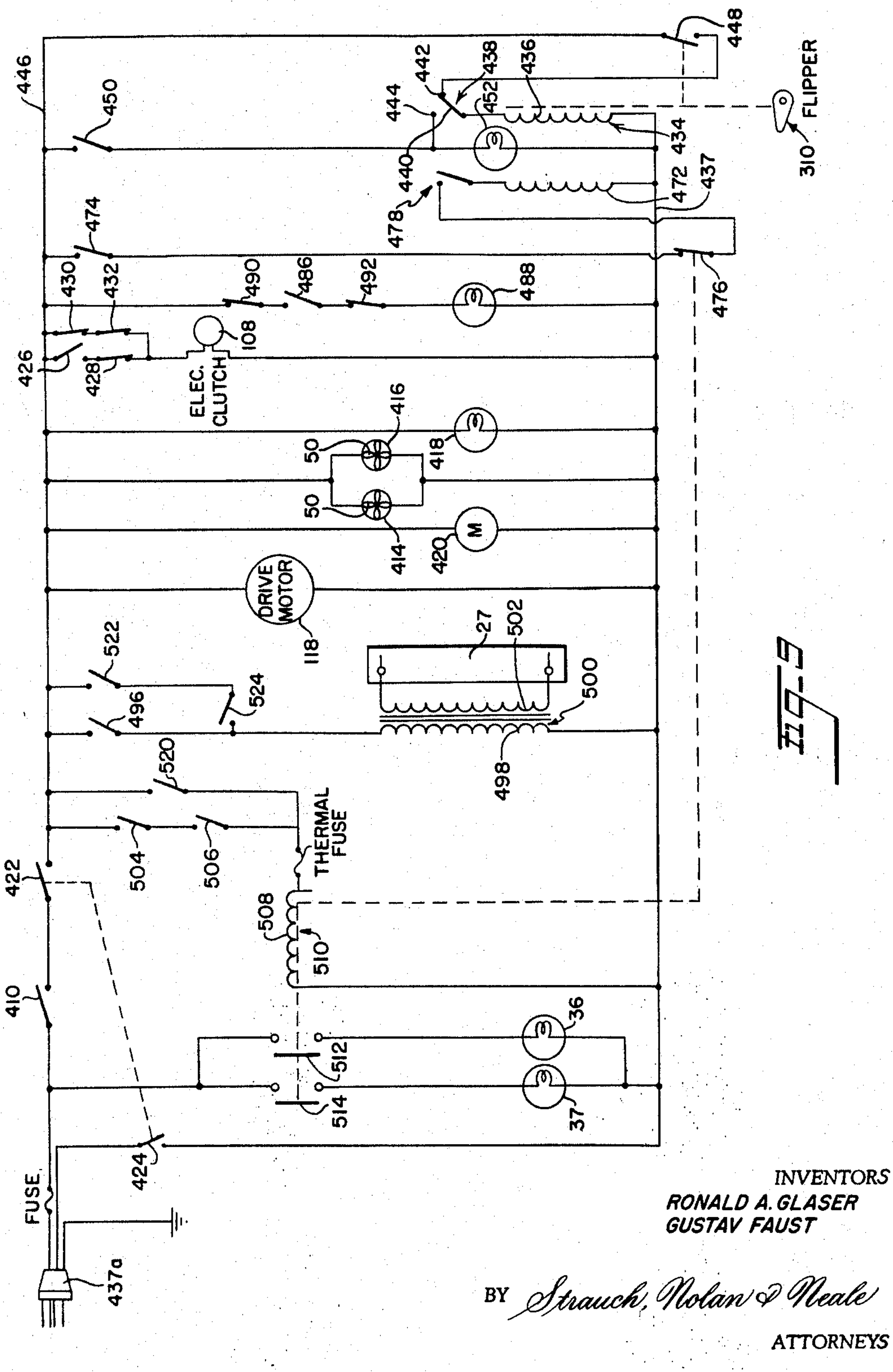
FIGURE 9 is a schematic diagram of the sequencing control circuit for the printer shown in FIGURE 1.

Referring now to FIGURES 2 and 9, a main on-off switch 410 mounted on the front of casing 22 is manually actuated to its "on" position for initiating operation of printer 20 by completing circuits through motor 118, a pump motor 412, motors 414 and 416 for exhaust fans 50, and a pilot lamp 418. Motor 412 drives a pump 420 (FIGURE 2) which circulates liquid developer or toner solution in tank 44.

Energization of motors 414 and 416 to drive fans 50 effects a flow of air in casing 22 to remove heat produced by the operation of printer 20 and to assist in drying and developing the copy paper after it passes through tank 44 and between squeegee rollers 46 and 48. Energization of motor 118 sets chain 112 in motion to continuously drive rollers 124, 125, 142, 144, 162, 164, 46, 48, 174, and 176 and conveyors 150 and 49 for transporting the copy paper. In addition, chain 112 will also continuously drive rollers 220, 222, 236, 238, 262, 264, 290, 292, and 320 and conveyor 48 for transporting the original document to be copied. Rollers 60, 62, 65, and 100 for removing the sheets of copy paper from stack 25 in compartment 24 will be rotated only when clutch 108 is energized.

With continued reference to FIGURES 2 and 9, switch 410 is connected in series with a pair of interlock switches 422 and 424 mounted on frame 23. Switches 422 and 424 are opened when casing 22 is removed. This prevents operation of printer 20 unless casing 22 is mounted in place on frame 23. With casing 22 mounted in place on frame 23 in the manner shown in FIGURE 1, switches 422 and 424 are closed to permit the circuits to be completed for energizing motors 118, 412, 414, and 416 whenever switch 410 is closed.

Closing of switch 410 also completes a circuit through a normally open switch 426 and a normally closed switch 428 for energizing clutch 108. Clutch 108 is also energizable through a pair of series connected, normally closed switches 430 and 432.

As best shown in FIGURE 2, switches 426 and 430 are mounted on frame 23 and have actuators disposed in the path of the document advanced by rollers 220 and 222 along guide 239. The actuators of switches 426 and 430 are so positioned that switches 426 and 430 will be actuated by the advancing document at the same time. It will be noted that all of the switches shown in FIGURE 9 which are actuated by the traveling document or sheets of copy paper are tripped by the leading edge of the document or copy paper as the case may be and are held in their tripped positions until the trailing edge of the document or copy paper clears the switch actuators.

Switch 428 is also mounted on frame 23 and has an actuator extending into the document feed path 240 between the actuators for switches 426 and 430 and rollers 236 and 238. Switch 432 is mounted on frame 23 and has an actuator extending across the feed path of the copy paper at a point along throat 123 between the ends of guides 121 and 122.

With continued reference to FIGURES 2 and 9, flipper 310 is actuated by a solenoid 434 mounted on frame 23 and having an operating coil 436. One terminal of coil 436 is connected through a conductor 437 to one side of the power source **437*a* shown in FIGURE 9. The other terminal of coil 436 is connected to a switch blade 440 of a two-position switch 438. Switch blade 440 is engageable with either a contact 442 or a contact 444. Contact 444 is connected through a conductor 446 to switch 410. Contact 442 is separately connected through a flipper hold switch 448 to conductor 446. Switch 438, as shown in FIGURE 2, is mounted on frame 23 with switch blade 440 extending across the document guide path defined by the rear turn around guide 281. A normally open switch 450 has one terminal connected to conductor 446 and its other terminal connected to contact 444 and also to conductor 437 through a multiple copy dial lamp 452 which is in parallel with operating coil 436**.

As best shown in FIGURE 2, solenoid 434 has a plunger 454 connected by a linkage 456 to shaft 318 of flipper 310. A coil spring 458 surrounding plunger 454 biases flipper 310 to its single copy full line position shown in FIGURE 2.

Figures 4, 10:
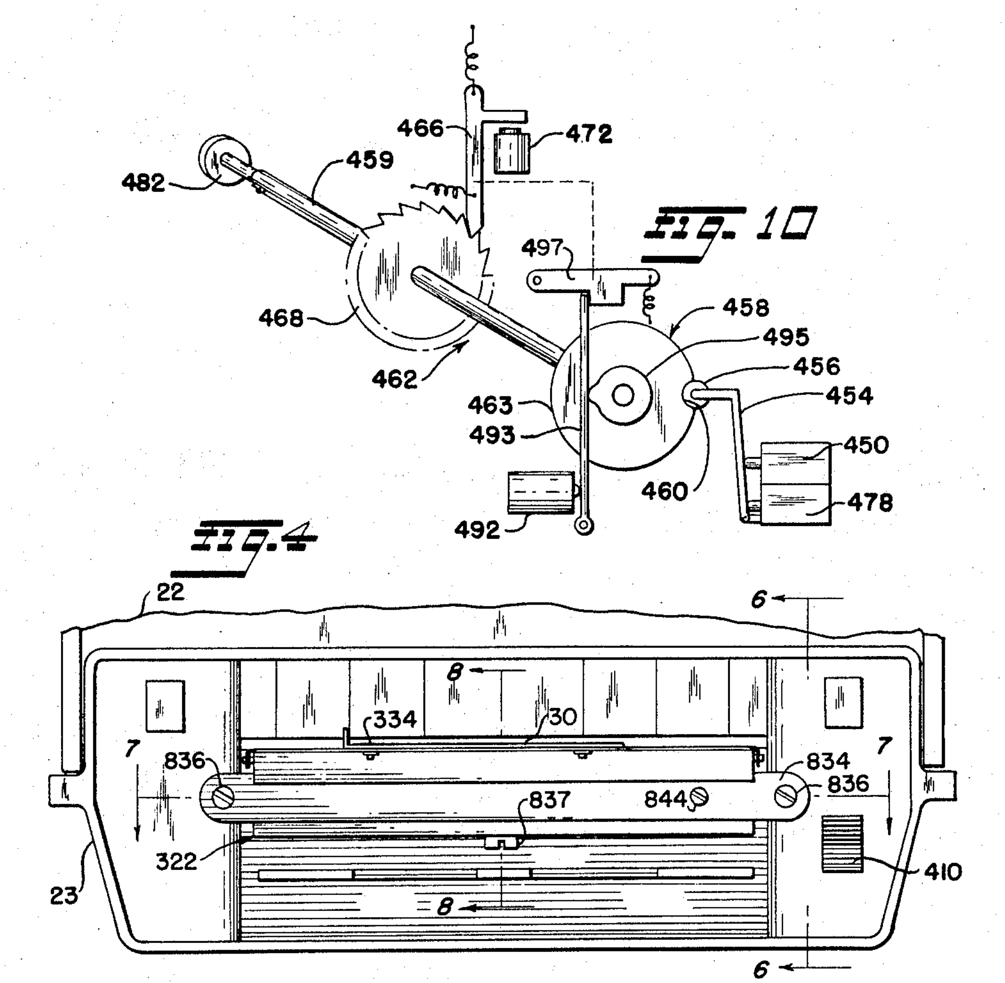
FIGURE 4 is a fragmentary front elevation of the printer shown in FIGURE 1.
FIGURE 10 (on sheet 4) is a partially schematic perspective view of the stepper switch mechanism illustrated in FIGURE 2.
Figure 11:
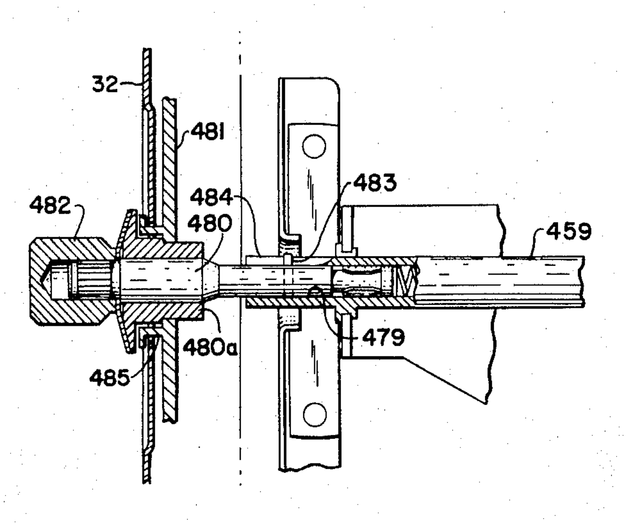
FIGURE 11 (on sheet 5) is a section taken substantially along lines 11—11 of FIGURE 2.

Referring now to FIGURES 10 and 11, switch 450 is actuated by a spring leaf 454 carrying a roller 456 that engages the periphery of a cam 458. Cam 458 is fixed on a rotatable shaft 459 of a selector dial drive comprising a stepper mechanism generally indicated at 462. Shaft 459 is mounted on frame 23 by suitable bearings (not shown) within casing 22. Stepper mechanism 462, as will be explained in detail later on, controls the rotation of shaft 459 and thus the actuation of switch 450 to provide for the production of a selected number of copies from a single original document.

The periphery of cam 458 is smooth and has a uniform radius except for a single longitudinal groove 460. When roller 456 is seated in groove 460 switch 450 is open as shown in FIGURE 9. When cam 458 is rotated so that roller 456 engages any other part of the cam periphery indicated at 463, switch 450 is closed.

With continued reference to FIGURE 10, stepper mechanism 462 is generally of conventional construction and comprises a pivotally mounted spring biased pawl 466 which is engageable with a ratchet wheel 468 fixed on shaft 459. Pawl 466 is attracted by energizing a stepper coil 472.

As shown in FIGURE 9, coil 472 is in parallel with coil 436. One terminal of coil 472 is connected to conductor 446 through a normally open switch 474, a normally closed switch 476, and a normally open switch 478. The other terminal of coil 472 is connected to conductor 437. As a result, switches 474, 476, and 478 in addition to switches 410, 422, and 424 all must be closed before coil 472 can be energized to attract pawl 466. As coil 472 is intermittently pulsed in a manner to be described shortly, pawl 466 engages ratchet wheel 468 to rotate shaft 459 and cam 458.

As best shown in FIGURE 11, shaft 459 is coaxially formed with a smooth, blind bore 479 which slidably receives a dial shaft 480. A sleeve 480*a* fixed on shaft 580 non-rotatably mounts a selector dial 481 within casing 22. Shaft 480 projects forwardly beyond panel 32 and non-rotatably mounts a suitable knob 482 to permit an operator to manually set the dial drive mechanism for making a selected number of copies from an original document. For this purpose, dial 481 is provided with circumferentially spaced indicia which are displayed through a window 482*a* (FIGURE 1) in panel 32.

With continued reference to FIGURE 11, a cylindrical pin 483 is received in a transverse through bore in shaft 480 and slidably projects at one end into a longitudinal, forwardly opening slot 484 formed in shaft 459 to non-rotatably lock shafts 459 and 480 together. By turning knob 482, shaft 459 is rotated to a position for conditioning printer 20 to automatically produce a selected number of copies as will be explained in greater detail later on. When it is desired to remove casing 22, shaft 480 is first axially withdrawn from bore 479. Dial 481 is slidably along sleeve 480*a* which is removed with shaft 480. As shown, dial 481 is provided with a hub portion extending through the opening in panel 32 and having an annular recess 485. When shaft 480 and sleeve 480*a* are fully removed, dial 481 drops into a position where recess 485 receives a portion of panel 32, thereby supporting dial 481 on panel 32 when casing 22 is removed.

As best shown in FIGURE 10, switch 478 is provided with an actuator which is operated by leaf 454 simultaneously with the operation of switch 450. Switch 474 is mounted on frame 23 and, as shown in FIGURE 2, has an actuator extending into the document feed path 240. Switch 474 is tripped by a document advancing towards rollers 236 and 238 simultaneously with the actuation of switches 426 and 430.

To produce only one copy of an original document, knob 482 is turned to position dial 481 at a single copy position where roller 456 seats in groove 460. In this position, switches 450 and 478 are opened to respectively interrupt the circuits for energizing solenoid 434 and coil 472. As a result, flipper 310 is biased into its full line, single copy position shown in FIGURE 2, and stepper mechanism 462 is inoperative to rotate cam 458 for actuating switches 450 and 478.

With motor 118 energized as a result of closing switch 410 and with dial 481 set to its single copy position, clutch 108 will be energized through switches 430 and 432. Rollers 60 and 62 engaging the top sheet of copy paper in stack 25 will be rotated in a counterclockwise direction as viewed from FIGURE 2 to feed the top sheet of copy paper through a slot in the rear end of compartment 24. The sheet of copy paper advanced by rollers 60 and 62 is fed between pick-up rollers 65 and 100 which advance the copy paper between guides 120 and 121 to trip switch 432 to its open position.

By opening switch 432, clutch 108 is immediately de-energized to interrupt the drive to rollers 60, 62, 65, and 100. By stopping rotation of rollers 65 and 100, the advancement of the sheet of copy is stopped at a ready position with its leading edge engaging the actuator of switch 432, thereby holding switch 432 open. It will be noted that the leading edge of the copy paper at this ready position is spaced from rollers 124 and 125 which are continuously rotated as long as motor 118 is energized.

With continued reference to FIGURES 2 and 9, the leading edge of the sheet of copy paper also engages an actuator of a normally open switch 486 simultaneously with the engagement of the actuator of switch 432. Switch 486 is closed by the advancement of the copy paper to its ready position to complete a circuit for energizing a feed lamp 488 through a pair of normally closed switches 490 and 492. Switches 486, 490, and 492 are connected in series with feed lamp 488 across conductors 437 and 446. Thus, when a sheet of copy paper is advanced to its ready position, feed lamp 488 will be illuminated provided that switches 490 and 492 are closed.

Switch 490 is mounted in frame 23 and, as shown in FIGURE 2, has an actuator extending into the document feed path 240. By advancing a document to be copied into printer 20, switch 490 is opened simultaneously with the actuation of switches 426, 430, and 474. Switch 492, as shown in FIGURE 10, is held closed by a leaf 493 and a cam 495 when roller 456 is seated in groove 460 of cam 458. Switch 492 remains latched in its closed position even though dial 481 is turned to some multiple copy position by a latch 497. When stepper coil 472 is energized, it raises latch 497 to open switch 492 which remains open until cam 458 is rotated to its single copy position where cam 495 engages leaf 493 to close switch 492.

Considering the operation of printer 20 for producing a single copy of an original document, cam 458, as previously mentioned, is turned to its single copy position where roller 456 seats in groove 460 to open switches 450 and 478 and to close and latch switch 492. When switch 410 is closed, energizing motor 118, clutch 108 is energized through switches 430 and 432 to transmit power for driving rollers 60, 62, 65, and 100. By rotating rollers 60 and 62, the top sheet of copy paper in stack 25 is advanced between rollers 65 and 100 which feed the copy paper through throat 123 to its ready position where its leading edge engages the actuators of switches 432 and 486 to open switch 432 and close switch 486. Opening of switch 432 de-energized clutch 108 to stop the advancement of the copy paper short of rollers 124 and 125 which are continuously rotating as previously explained. Closing of switch 486 completes a circuit through switches 490 and 492 to energize feed lamp 488, signalling the operator to manually feed in the original document to be copied into the printer.

The original document inserted through slot 30 is advanced along guide path 240 by rollers 220 and 222 which are rotating continuously. The leading edge of the document after passing between rollers 220 and 222 simultaneously engages the actuators of switches 426, 430, 474, and 490 to close switches 426 and 474 and to open switches 430 and 490. Opening of switch 490 interrupts the circuit for feed lamp 488 to signal the operator of the printer. Closing of switch 474 will not complete a circuit for energizing stepper coil 472 since switch 478 is held open by cam 458.

By closing switch 426, another circuit through switch 428 is momentarily completed to re-energize clutch 108. As a result, a drive connection is established at the moment the leading edge of the original document actuates switch 426 to again rotate rollers 65 and 100 and advance the sheet of copy paper which had been previously advanced to its ready position in throat 123. This control of the operation of clutch 108 by the advancement of the original document towards imaging station 33 thus establishes a timed relationship between the movement of the copy paper and the document to be copied to assure that the copy paper and the document pass through their respective imaging stations 28 and 33 at the same time.

After switch 426 is closed by advancement of the document to be copied, clutch 108 remains energized by the circuit traced through switches 426 and 428 until the leading edge of the document has advanced sufficiently far along guide 239 to trip switch 428 to its open position. Opening of switch 428 interrupts the energizing circuit for clutch 108, and since switch 432 is held open by the sheet of copy paper advancing from its ready position, clutch 108 will remain de-energized until the trailing edge of the copy paper clears the actuator of switch 432 and the trailing edge of the original document clears the actuator of switch 430. Thus, clutch 108 remains re-energized to advance the sheet of copy paper from its ready position in throat 123 for the period of time that the leading edge of the document to be copied moves from the actuator of switch 426 to the actuator of switch 428.

The distance along the copy paper guide path between the actuator of switch 432 and rollers 124 and 125 is somewhat less than the distance along the document guide path between the actuators of switches 426 and 428. Since the copy paper and the document to be copied are both advanced by motor 118 at essentially the same speed, then the sheet of copy paper will be advanced sufficiently far to be picked up by rollers 124 and 125 when clutch 108 is momentarily energized through the circuit completed by closing switches 426 and 428. As previously explained, rollers 124 and 125 are continuously rotated as long as motor 118 is energized to feed the copy paper toward corona unit 27.

At the same time that the leading edge of the document to be copied engages the actuators of switches 426, 430, 474, and 490, it also engages an actuator of a normally open switch 496 which, as shown in FIGURE 9, is connected in series with a primary winding 498 of a high voltage transformer 500. Transformer 500 is provided with a secondary winding 502 which is preferably connected to corona unit 27 in the manner indicated in said copending application Ser. No. 366,268. When the actuator of switch 496 is tripped by the advancing document, switch 496 closes to complete a circuit through winding 498 to energize corona unit 27 at the same time that clutch 108 is re-energized to start the advancement of the first sheet of copy paper from the ready position in throat 123 towards rollers 124 and 125. Rollers 124 and 125 feed the copy paper through corona unit 27 which now has been activated to apply a uniform charge to the copy paper surface as previously described. Rollers 142 and 144, which are also continuously rotated when motor 118 is energized, pick-up the charged copy paper emerging from corona unit 27 and advance the copy paper towards imaging station 28.

Referring to FIGURES 2 and 9, the leading edge of the advancing document to be copied trips an actuator to close a further normally open switch 504 at the same time that it trips switch 496. Actuation of switch 504 to its closed position closes a circuit to another normally open switch 506 which is tripped to its closed position by the leading edge of the advancing document at the same time that switch 428 is opened. Switches 428 and 506 are tripped by the advancing document considerably before the trailing edge of the document clears the actuators of switches 426, 430, 474, 490, 496, and 504 with the result that switches 426, 430, 474, 490, 496, and 504 are held in their tripped positions when the document trips switches 428 and 506.

By closing switches 504 and 506 a circuit is completed to energize a winding 508 of a relay 510 in an energizing network for projection lamps 36 and 37. Energization of relay 510 closes two sets of normally open relay contacts 512 and 514 and opens switch 476. Contacts 512 and 514 are respectively connected in series with projection lamps 36 and 37 across conductors 446 and 437. As a result, lamps 36 and 37 are illuminated by advancement of the document to be copied to the position along guide path 240 where it trips switch 506 after tripping switch 504.

The function of switch 476 will be explained later on in connection with the production of multiple copies.

The document to be copied is advanced by rollers 220 and 222 to rollers 236 and 238 which feed the document through imaging station 33. At the same time, the sheet of copy paper advanced through corona unit 27 is picked up by rollers 142 and 144 which feed the copy paper through imaging station 28. The copy paper and the document to be copied are advanced through their respective imaging stations at the same speed.

As the original document passes through its imaging station 33, it is struck by the light emitted from projection lamps 36 and 37, and the image of the document is reflected by mirror 38 into the image projector 29 through lens 40. The image passing through imaging projector 29, emerges through a glass plate 618 (FIGURE 2) and strikes the negatively charged surface of the copy paper passing through imaging station 28. The uniform negative charge on the copy paper is reduced in proportion to the intensity of the light striking the copy paper surface. Since little light will be reflected from the black areas of the original, the charge on areas of the copy paper against which the light reflected from such areas strikes will be reduced very slightly. On the other hand, the charge on areas of the copy paper struck by the light reflected from white areas of the original, such as the white background of a letter, will almost be entirely dissipated since the most intensive light will be reflected from those areas. As the original and the copy paper continue through their respective imaging stations, the image on the original is reproduced in latent form on the copy paper through dissipation of the charge on its surface in the manner described above.

As the copy paper emerges from imaging station 28 as shown in FIGURE 2, it simultaneously trips two normally open switches 520 and 522 before entering tank 44. By closing switch 520, a further circuit, as shown in FIGURE 9, is provided in parallel with the circuit through switches 504 and 506 for maintaining relay 510 energized. Shortly after switch 520 is tripped, the trailing edge of the original document clears the actuators of switches 426, 430, 474, 490, 496, and 504 where the original document and the sheet of copy paper are about the same length. As a result, switches 426, 474, 496, and 504 will open, and switches 430 and 490 will close. Although switch 504 opens at this time, projection lamps 36 and 37 remain illuminated as a result of the relay energizing circuit completed by closing switch 520.

If the sheet of copy paper and the document are the same length, the trailing edge of the copy paper will clear the actuators of switches 432 and 486 at the same time that the trailing edge of the document clears the actuators of switches 426, 430, 474, 490, 496, and 504 with the result that switches 432 and 486 will respectively open and close at the same time that switches 426, 474, 496, and 504 open. Closing of switches 430 and 432 again completes a circuit for energizing clutch 108 to drive rollers 60 and 62 for advancing the next sheet of copy paper in stack 25 to rollers 65 and 100. Rollers 65 and 100, as previously described, advance the new sheet of unprocessed copy paper through throat 123 to the ready position where the leading edge of the copy paper trips switch 432 to de-energize clutch 108. With dial 481 set at its single copy position, an original document must again be inserted manually into the printer to cause further advancement of this sheet of unprocessed copy paper from its ready position.

After the trailing edge of the original document clears the actuator of switch 496, corona unit 27 remains energized through switch 522 and a normally open switch 524. Switch 524 is connected in series with switch 522 and winding 498 and has an actuator which is positioned in document feed path 240 to be tripped to its closed position simultaneously with the actuation of switches 428 and 506. Corona unit 27 will remain energized as a result of the closing of switch 522 by the copy paper and the closing of switch 524 by the original document.

When the trailing edge of the original document clears the actuators for switches 428, 506, and 524, switch 524 will open to de-energize corona unit 27. Although switch 506 opens at this stage of the operation, relay 510 and, consequently, projection lamps 36 and 37 remain energized through switch 520.

As the copy paper which was advanced through corona unit 27 and imaging station 28 passes through tank 44, its trailing edge clears the actuator for switch 520, permitting this switch to open with the result that projection lamps 36 and 37 will turn off. The processed copy paper is advanced from tank 44 to surface 52 where it may be removed from the printer as previously explained. The original document, in the meantime, is advanced through the rear turn-around guide 281. As the document emerges from guide 281, it is picked by rollers 290 and 292 and fed toward front panel 32. With flipper 310 in its raised, full line position shown in FIGURE 2, the document advanced by rollers 290 and 292 is guided under flipper 310 and is deposited in tray 312 for removal by the operator.

To automatically make more than one copy of an original document, dial 481 is manually set to the number of copies desired. This revolves ratchet wheel 468 by a number of notches corresponding to the number of copies to which dial 481 is set. By turning dial 481 away from its single copy position, cam 458 is also rotated to displace roller 456 from groove 460, causing it to engage periphery 463. As a result switches 450 and 478 will close.

By closing switch 450, solenoid 434 is energized to swing flipper 310 downwardly to its document recycling position shown in dot-dash lines in FIGURE 2. Also, switch 448 is closed by energizing solenoid 434 for a purpose to be explained shortly. By closing switch 478, a circuit for energizing stepper coil 572 will be established when switch 474 is closed, provided that switch 476 is also closed.

When switch 410 is now closed, motors 118, 412, 414, and 416 and clutch 108 are energized in the manner previously explained. As a result, the top sheet of copy paper is advanced from stack 25 to its ready position in throat 123 where the leading edge of the sheet trips switches 432 and 486 to deenergize clutch 108 and energize feed lamp 488 as previously described. The operator now feeds the document to be copied through slot 30 where it is picked up by rollers 220 and 222 and advanced along guide path 240. As the document is fed towards imaging station 33, the leading edge of the document will trip switch 474 to its closed position simultaneously with the actuation of switches 426, 430, 490, 496, and 504 as previously described. By closing switch 474 a circuit is completed through switch 476 and 478 to energize stepper coil 472. Switch 476 will be closed since, at this stage of the operation, relay 510 is de-energized.

Advancement of the document to be copied a short distance along guide path 240 trips switch 506 to its closed position in adidtion to actuating of switches 428 and 524. By closing switch 506, as previously explained, a circuit is completed through switch 504, which is being held closed by the document in guide path 240, to energize relay 510, thereby opening switch 476 to interrupt the energizing circuit for stepper coil 472. Thus by the closing of switch 474 followed shortly by the opening of switch 476, stepper coil 472 is pulsed to momentarily attract pawl 466, causing it to revolve ratchet wheel 468 by one notch towards the notch that corresponds to the single copy position where roller 456 seats in groove 460.

Assuming that dial 481 was originally set to make three copies of the original document, the first pulse of stepper coil 472 resulting from the sequential actuation of switches 474 and 476 moves cam 458 to a position where groove 460 is removed from roller 456 by a distance corresponding to two notches on ratchet wheel 468. As a result, switches 450 and 478 are still held in their closed positions.

The first pulse of stepper solenoid 472 unlatches the actuating leaf of switch 492, permitting switch 492 to open with the result that the energizing circuit for feed lamp 488 is interrupted. Lamp 488 will not be illuminated again until cam 458 is rotated to its single copy position where roller 456 seats in groove 460 to close and relatch switch 492 and until another sheet of copy paper is fed from compartment 24 to close switch 486.

As the original document is advanced along guide path 240, clutch 108 is re-energized momentarily in the manner previously explained to start the advancement of the copy paper at the ready position in throat 123. In addition, projection lamps 36 and 37 and corona unit 27 are energized in the manner described in the operation of printer 20 for making a single copy. The original document and the first sheet of copy paper then pass through their respective imaging stations 28 and 33, and the image of the original is printed on the copy paper which then is conveyed through tank 44 to tray surface 52.

As the original document clears the actuator of switch 430 and the first sheet of copy paper clears the actuator of switch 432, switches 430 and 432 close to re-energize clutch 108 to revolve rollers 60, 62, 65, and 100 for advancing the next sheet of copy paper in stack 25 to the ready position in throat 123 in the same manner as previously described. The original document advancing through imaging station 33 is fed through the rear turn around guide 281 where its leading edge trips switch 438 to shift switch blade 440 into engagement with contact 442. The solenoid energizing circuit for holding flipper 310 in its downwardly swung, recycling position is now established through switch 448. This flipper solenoid energizing circuit arrangement assures continuity of power to keep flipper solenoid 434 energized as the document passes over flipper 310 even if dial 481 is set back at this time to its single copy position.

As a result of retaining flipper 310 in its recycling position, the document emerging from the rear turn around guide 281 is routed through path 308 and into throat 321 where the front turn around guide 322 deflects the document, as previously described, into the nip between rollers 220 and 222. Rollers 220 and 222 recycle the document through guide path 240 where switches 426, 430, 474, 490, 496, and 504 are first tripped, followed by the actuation of switches 428, 430, 506, and 524 in the same manner as hereinbefore described.

The sequential actuation of switches 474 and 476 again pulses stepper coil 472 to rotate cam 458 by a distance corresponding to one notch on ratchet wheel 468. In this position roller 456 still engages periphery 463 and is removed from groove 460 by a distance now corresponding to only one notch on ratchet wheel 468 with the result that switches 450 and 478 are still held in their closed positions.

Recycled advancement of the original document along path 240 and through station 33 operates clutch 108 to advance the second sheet of copy through corona unit 27 and imaging station 28 with the result that a second copy is produced. Also, the third sheet of copy paper in stack 25 is withdrawn from compartment 24 and advanced to its ready position in throat 123. Operation of the various control switches resulting from the recycling of the original document and the advancement of the second sheet of copy paper is the same as previously explained.

Since flipper 310 is still held in its downwardly swung, recycling position, the original document, which at this stage, has passed through imaging station twice will again be routed through path 308 and into throat 321 where guide 322 deflects it into rollers 220 and 222.

As the document is now advanced for the third time along guide path 240, it will cause the sequential actuation of switches 474 and 476 to pulse stepper coil 472 for the third time. The third pulse of coil 472 now returns cam 458 to its single copy position where roller 456 seats in groove 460. As a result, switches 450 and 478 will open to interrupt the energizing circuits for stepper coil 472 and for flipper solenoid 434. Flipper 310 is then released to swing upwardly to its single copy position.

The document and the third sheet of copy paper will now pass through their respective imaging stations 33 and 28 to produce the third and final print. When the document now emerges from the rear turn around guide 281, flipper 310 being in its upwardly swung, single copy position, routes the document into ejection path 306, depositing the document on tray 312 for removal by the operator. Actuation of switch 448 by the document as it is recycled in making the third print will not be effective to energize flipper solenoid 434 since switch 448 was opened as a result of de-energizing solenoid 434 when the document was advanced for the third time along guide path 240.

Owing to unavoidable manufacturing tolerances, the dimensions of the various document engaging parts, such as the feed and pick-up roller diameters, will vary over a small predetermined range. These variations in the dimensions of the paper engaging parts constitute a major factor causing the traveling document to turn or become skewed as it is moved through the printer. Another factor causing the document to skew is the unavoidable mounting of the various pick-up and feed roller assemblies about axes which are not exactly at right angles with respect to the direction of movement of the traveling document.

The skew imparted to the traveling document is objectionable, as previously mentioned, since the print on the copy paper will also be skewed by a corresponding angle while the copy paper continues always in its normal path. Moreover, the angle of skew usually becomes progressively larger each time the document recycles through its route and if the number of cycles is sufficiently large, the document will eventually shift in position sufficiently far as to provide unusable copies.

According to one feature of this invention, means such as photocells, are provided to detect the angle of skew of the original document to be copied after it has been inserted into the apparatus and to effect a correcting movement upon the document. In some embodiments, the correcting movement involves automatically ejecting the document just as though the apparatus was set for making a single copy, if the document skew is beyond a certain limit. In other embodiments, the correcting movement involves bringing into operation the skew correcting mechanism and effecting the correcting movement as the document is recycled. In some embodiments, both types of correcting movements are provided.

In the preferred embodiment now to be described, the printer is so constructed that the degradation of the document engaging guide and roller parts imparts a definite and fixed amount of skew to the traveling document only in one direction. This may be done during manufacture of the printer as by slightly misaligning one or more of the shafts mounting the document pickup or feed rollers so that the rotational axis of the skewed shaft is at a slight angle relative to a line normal to the direction of travel of the document, or by adjusting one of the turn around guide members. For purposes of this description, it will be assumed that the intentional degradation in the document feed path will effect skew in a clockwise direction and the correcting movement will impart a predetermined amount of skew to the document in a counterclockwise direction.

By so limiting the direction of unavoidable document skew resulting from assembly during manufacture to one direction, the means whereby the skew is corrected need only operate to produce a correcting skew in the opposite or counterclockwise direction, rather than being bi-directional to correct for skews in both clockwise and counterclockwise directions. This aspect of the invention greatly simplifies and reduces the cost of the structure needed to correct the skew of the document as will presently become apparent as the description proceeds.

Figure 12:
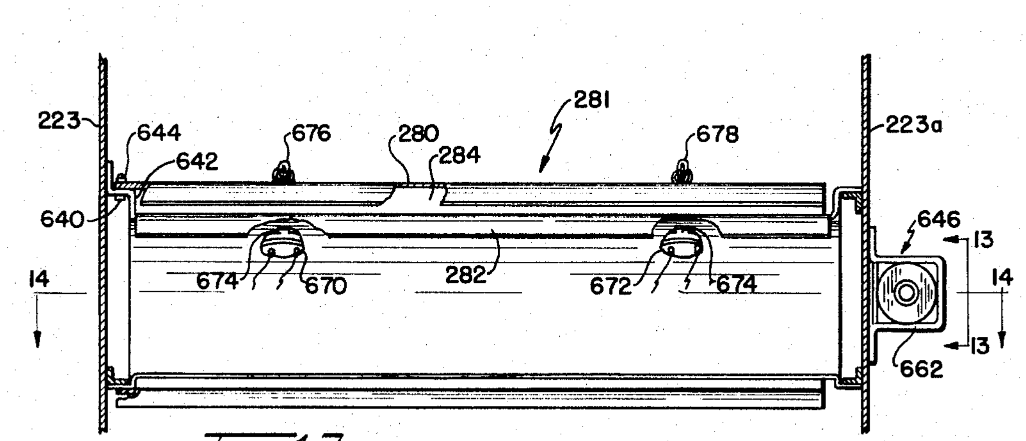
FIGURE 12 is a section taken substantially along lines 12—12 of FIGURE 6.

To reduce the angle of skew of the traveling document or at least prevent this angle from becoming larger as the document is recycled in making multiple copies, outer turn-around guide 284, as best shown in FIGURE 12, may be rockably supported on inner turn-around guide 282 as by a hinge assembly comprising a headed bolt 640 and nut 644. Bolt 640 extends through aligned apertures formed in the upper left-hand corner of guide 284 and a marginal, offset flange portion 642 formed integral with guide 282. Nut 644 is threaded on the end of bolt 640 projecting beyond the guide 284. As previously mentioned, inner turn-around guide 282 is fixed to panels 223 and **223*a***.

Figure 13:
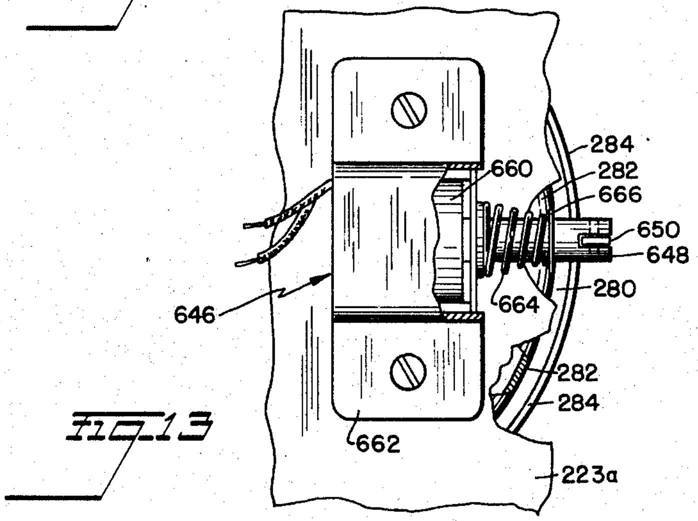
FIGURE 13 is a section, enlarged in size, taken substantially along lines 13—13 of FIGURE 12.
Figure 14:
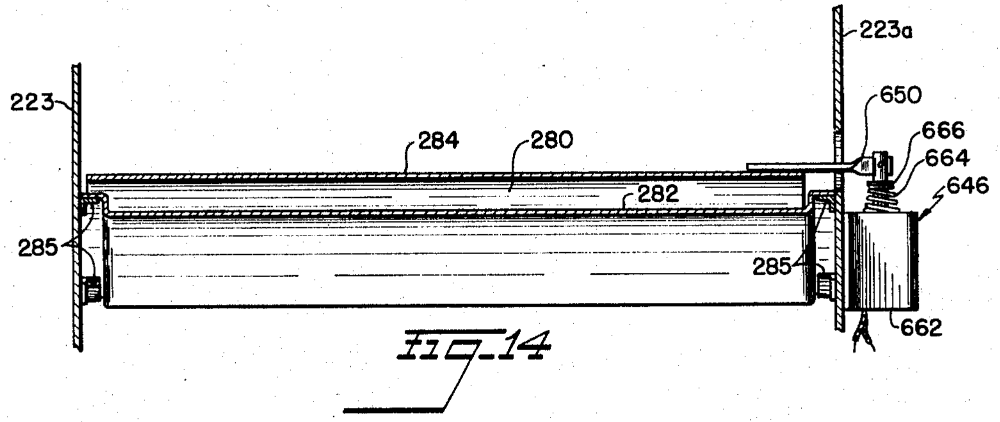
FIGURE 14 is a section taken substantially along lines 14—14 of FIGURE 12.
Figure 15:
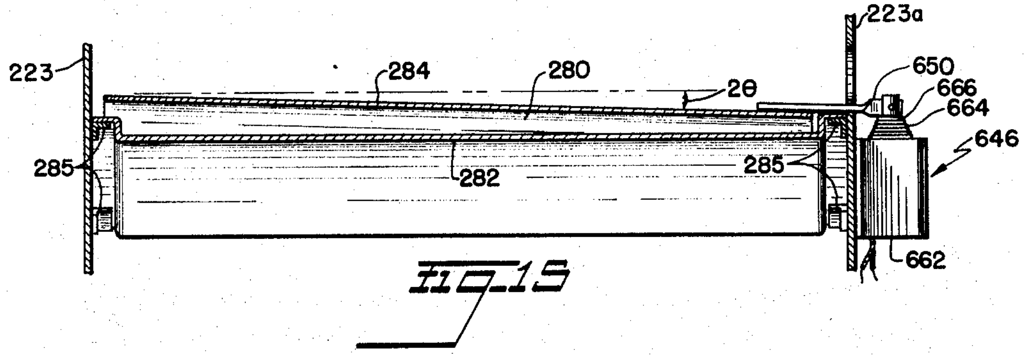

As best shown in FIGURES 13 and 14, a solenoid 646 is provided with an axially displaceable plunger 648 which is fixed to the right-hand side of guide 284 by a rigid support arm 650. Axial displacement of plunger 648 is transmitted by arm 650 to effectively rock outer turn-around guide 284 about the axis of bolt 640 for swinging the right-hand end of guide 284 toward or away from guide 282 as viewed from FIGURE 14.

As best shown in FIGURE 6, outer turn-around guide 284 is formed with a substantially semi-cylindrical document deflecting surface 652 having a uniform radius extending from an axis of revolution indicated at 654. Inner turn-around guide 282 is similarly formed with a substantially semi-cylindrical document guide surface 656 facing surface 652 and having a uniform radius extending from a revolution axis 658 which is substantially normal to the longitudinal axis of plunger 648 (FIGURE 13) and to the direction of travel of the document entering throat 280. The revolution axes 654 and 658 of surfaces 652 and 656 preferably are substantially coextensive and are contained in an essentially common radial plane passing medially between the entrance and exit ends of surfaces 652 and 656.

As best shown in FIGURE 13, solenoid 646 is provided with an operating coil 660 which is mounted in a bracket 662. Bracket 662 is fixed by any suitable means to panel **223*a*. A coiled spring 664 surrounding plunger 648 and engaging a groove seated snap ring 666 carried by plunger 648 reacts against bracket 662 to axially bias plunger 648** in a rearward direction.

When coil 660 is de-energized, spring 664 acting against plunger 648 biases guide 284 to a position shown in FIGURE 14 where the revolution axes 652 and 656 are essentially parallel. In this position, the depth of throat 280 is substantially uniform extending from the left-hand side to the right-hand side of assembly 281.

When coil 660 is energized to attract plunger 648 against the bias of spring 664, guide 284 is swung about its pivot axis to a position shown in FIGURE 15 where the revolution axis 654 intersects the revolution axis 658 at a small acute angle and where guide 284 is closer to guide 282 at its right-hand side than at its left-hand side as viewed from FIGURE 15. In this position, throat 280 becomes progressively narrower extending from the left side to right side of assembly 281 as viewed from FIGURE 15.

As best shown in FIGURE 6, roller assemblies 290 and 292 are located closely adjacent to the exit of throat 280 to impart a direction of travel to the emerging document which is essentially normal to the revolution axis 658. The direction of travel imparted to the document by rollers 262 and 264 at the entrance to throat 280 is also substantially normal to the revolution axis 658. By moving the document in this direction, guide 284, when swung to its forwardly canted position shown in FIGURE 15, will skew the document in a counterclockwise direction which is opposite to the direction of skew imparted to the document by the various document engaging and roller parts. In this connection it will be appreciated that when guide 284 is in its canted position shown in FIGURE 15, the left-hand side of the document will travel an effectively greater distance through throat 280 than the right-hand side of the document. As a result, the document will turn or skew in a counterclockwise direction as viewed from the outwardly facing side of the traveling document. Thus, by shifting guide 284 to its skew correcting position shown in FIGURE 15, the clockwise angle of skew imparted to the document by the document engaging guide and roller parts will be reduced or eliminated.

For a purpose to be explained later on in detail, the angle through which guide 284 is swung from its position in FIGURE 14 to its position in FIGURE 15 preferably is made equal to twice the clockwise angle of skew imparted to the document by the degradation of the document engaging guide and roller parts in one complete cycle. Thus, if the angle of skew intentionally imparted to the document for each cycle of the document as a result of the adjustments of the document engaging guide and roller parts is $\theta$ then the angle which the revolution axis 654 makes with the revolution axis 658 when guide 284 is in its forwardly canted, skew correcting position shown in FIGURE 15, is made to be at least $2\theta$ (FIGURE 15). The angle $\theta$ may be quite small. However, it is evident that this angle of skew of the document will objectionably increase in accordance with the number of times the document is cycled through its endless, multiple copy producing path. Thus, if the document is cycled three times for making three copies, the clockwise angle of skew imparted to the document as a result of the degradation of the various document engaging guide and roller parts will become $3\theta$ unless the document is reoriented to correct this undesirable skewed condition.

Figure 16:
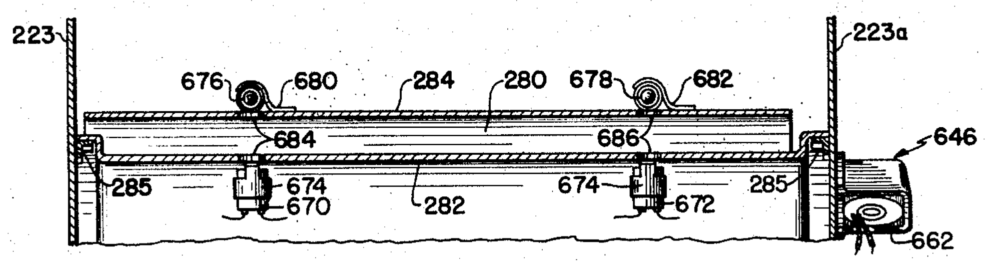
FIGURE 16 is a section taken substantially along lines 16—16 of FIGURE 6.

To sense the skew of the traveling document, a pair of photocells 670 and 672 such as CdS photoresistors, are fixedly mounted on inner turn-around guide 282 as by rigid brackets 674 as best shown in FIGURE 16. Cell 670 may be located about midway between the center and left-hand side of guide 282 closely adjacent to the entrance of throat 280 and cell 672 similarly located on the right-hand side of guide 282.

With continued reference to FIGURE 16, the light source for photocells 670 and 672 may comprise lamps 676 and 678, or light from lamp 36 may be used. Lamps 676 and 678, if used, may be mounted on the rearward side of guide 284 by brackets 680 and 682 respecively.

The light source and photocells 670 and 672 are so positioned that the light beams are interrupted by the leading edge of the document which, when the document is properly positioned, lies along a straight line extending parallel to the revolution axis 658 and closely adjacent to the entrance end of throat 280. With this construction, it will be appreciated that when the traveling document is so oriented that its leading edge is parallel to the revolution axis 658, the cell activating light beams are simultaneously interrupted with the result that the resistance of both cells 670 and 672 change at the same time. When the traveling document is skewed so that its forward lefthand corner enters throat 280 first, the light beam for rendering cell 670 conductive is interrupted before the light beam directed at cell 672 is blocked. Under these conditions, the resistance of cell 670 increases while cell 672 remains conductive for a short period of time until the skewed document has traveled sufficiently far into throat 280 to interrupt also the light beam directed at cell 672. Similarly, if the traveling document is skewed in the opposite direction, the light to cell 672 is blocked before the light to cell 670 is interrupted.

Figure 17:
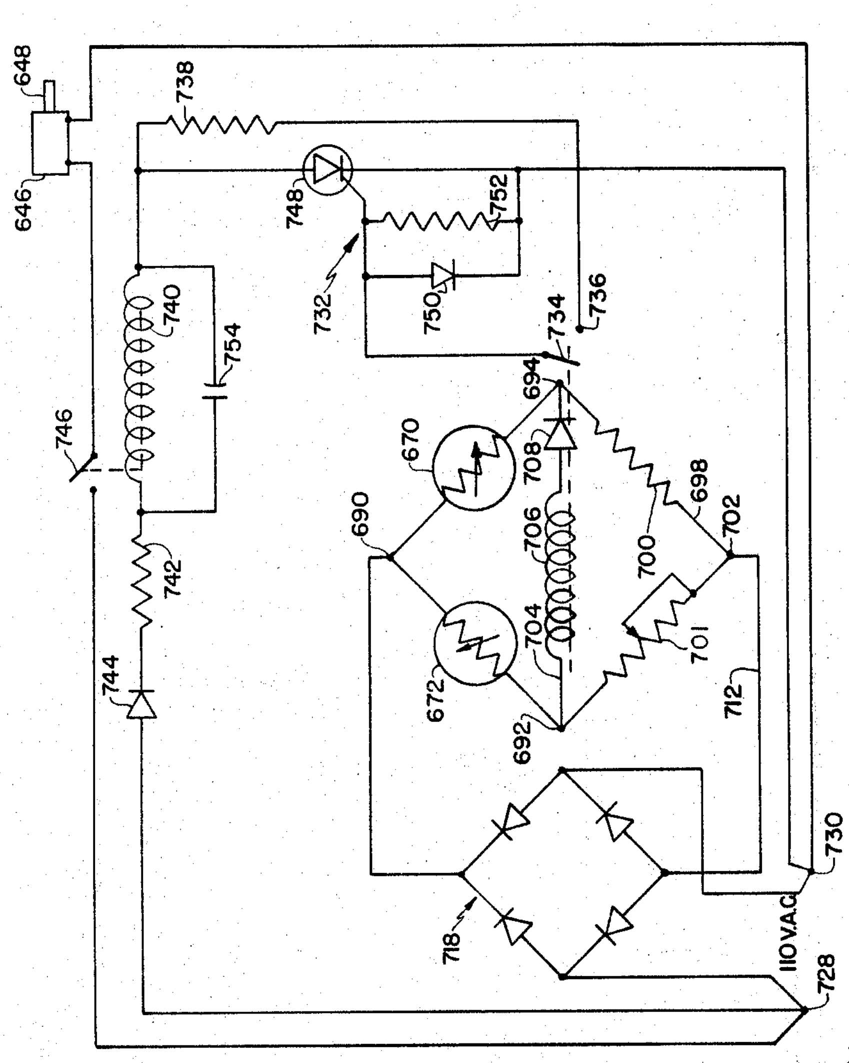
FIGURE 17 is a schematic circuit diagram of the document skew detecting and correcting circuit for the printer shown in FIGURES 1–16.

Referring now to FIGURE 17, photocells 670 and 672 may be connected together with a fixed resistor 700 and a variable resistor 701 in the form of a Wheatstone bridge circuit having input terminals 690 and 702 and output terminals 692 and 694. Variable resistor 701 is adjustable to selectively balance the bridge. In this embodiment, the power supplied to input terminals 690 and 702 is from a full wave rectifier circuit 718 which is energized with the alternating current line voltage applied to terminals 728 and 730.

A sensitive relay having a moving contact arm 734 is connected with its energizing winding 706 between the bridge output terminals 692 and 694 as a branch circuit 704 which includes also diode 708.

From the foregoing bridge circuitry, it will be appreciated that when cells 670 and 672 both are equally illuminated, the bridge circuit is balanced with the result that winding 706 is de-energized. When the traveling document entering throat 280 is skewed in a clockwise direction, the light beam for maintaining cell 670 conductive is blocked before the light beam directed at cell 672 is interrupted. As a result, the resistance of cell 670 increases before the resistance of cell 672 is increased to momentarily unbalance the bridge circuit. Under this unbalance condition, the voltage drop across cell 670 will be greater than the voltage drop across cell 672 with the result that a voltage of higher magnitude will be applied to terminal 692 in comparison with the voltage applied at terminal 694. As a consequence, current will flow through branch 704 to energize winding 706 momentarily or for so long as this unbalanced bridge condition is maintained.

If the traveling document entering throat 280 is skewed in a counterclockwise direction such that the light beam to cell 672 is interrupted before the light beam directed at cell 670 is blocked, a higher voltage will be applied to terminal 694 in comparison with the voltage applied at terminal 692. Under this unbalanced bridge condition, however, the voltage at the cathode terminal of diode 708 will be greater than the voltage at the anode terminal of diode 708, thus preventing energizing current flow through winding 706.

From the foregoing, it is evident that diode 708 permits relay winding 706 to be energized only when the traveling document is skewed in a clockwise direction as viewed from the outwardly facing side of the document traveling in its endless, multiple copy producing path.

A control circuit 732, shown in FIGURE 17, is activated as the result of energization of winding 706 to energize solenoid 646 for a time interval at least as long as the time required for the leading edge of the document to enter into the nip of rollers 290 and 292 (see FIGURE 6) in a manner to be explained shortly. By energizing solenoid 646, outer turn-around guide 284 is rocked to the position shown in FIGURE 15 so as to impart a predetermined amount of skew in the clockwise direction to the traveling document.

As shown in FIGURE 17, control circuit 732 comprises a controlled rectifier 748, which may be conventional silicon controlled rectifier (SCR) and which has its anode terminal connected through relay 740, resistor 742 and diode 744 to terminal 728 and its cathode terminal connected to terminal 730. These terminals 728 and 730 may be connected to the line voltage available in the printer as is evident from the circuit diagram in FIGURE 9.

The control terminal for SCR 748 is connected to the fixed contact of arm 734 which is moved from its normal open circuit position as illustrated in FIGURE 17 to fixed contact 736 when coil 706 is energized to indicate a bridge unbalance. Fixed contact 736 is connected through resistor 738 to the anode terminal of SCR 748 and enables SCR 748 to fire on the positive going half cycle of the alternating voltage applied to terminals 728 and 730 when movable arm 734 is against fixed contact 736.

Diode 750 and resistor 752 are connected between the control terminal and the cathode terminal of SCR 748 in the usual manner.

As the bridge circuit remains unbalanced only for the short time interval that the photocells are subject to illumination of different intensities and as SCR 748 extinguishes each time the energizing alternating voltage reverses polarity at terminals 728 and 730, the length of time which the SCR 748 remains energized is insufficient to effect a correcting movement to the position of the document.

Relay 740 accordingly may be provided with a capacitor 754, resistor 742 and diode 744 to provide a slow release action. By appropriate selection of the parameters of these components, or by the use of other conventional means such as a dash pot, contact 746 which is closed when relay 740 is energized, may be held in a closed position for a time period at least equal to that required for the leading edge of the document to traverse the distance between photocells 672 (see FIGURE 6) and the nip of rollers 290 and 292. When switch contact 746 is closed, operating voltage is applied from terminals 728 and 730 to solenoid 646 which contains plunger 648 that shifts the position of the outer turn-around guide 284.

Figure 18:
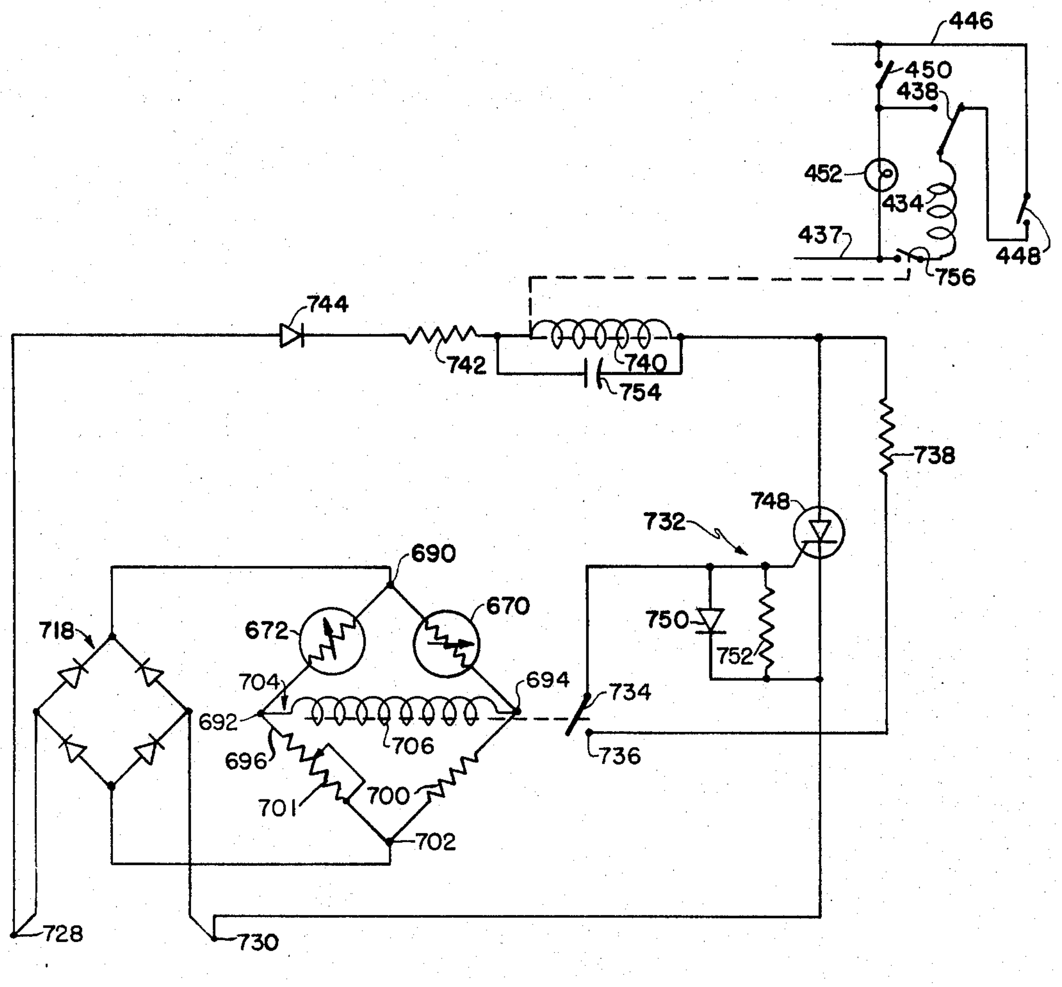
FIGURE 18 is a schematic circuit diagram of a second document skew detecting circuit for ejecting the original document when the skew of the document exceeds a predetermined angle in either direction.

A second form of skew responsive circuit shown in FIGURE 18 is for automatically ejecting a recycling document from its endless path rather than adjusting a component in the document transport path which effects an adjustment of the skew of the document. This circuit is similar to the circuit of FIGURE 17, and to the extent both circuits are alike, like reference numerals have been employed to designate like elements. In the circuit shown in FIGURE 18, diode 708 has been omitted and relay winding 740 is energizable to open a normally closed switch 756 in response to skew of the document in either direction. Switch arm 756 is in series with flipper solenoid 434, rather than solenoid 646 for shifting a turn-around guide.

With diode 708 removed from the bridge circuit, relay winding 706 becomes energized when cells 670 and 672 sense a skew of the traveling document in either direction. When the angle of skew in either direction becomes so great as to energize relay winding 706, the voltage applied to the gate of rectifier 748 increases sufficiently to fire rectifier 748 as previously mentioned. As a result, relay winding 740 is energized to open switch 756, thereby interrupting the energizing circuit for flipper solenoid 434. By de-energizing solenoid 434, flipper 310 swings to its single copy position for ejecting the recycling document onto tray 312. The time period that winding 740 remains energized to keep switch 756 open is sufficient to permit the document to travel from the entrance of throat 280 to a position beyond flipper 310.

The circuit shown in FIGURE 18 for automatically ejecting a recycling document upon the sensing of a predetermined document skew angle by cells 670 and 672 is employed in conjunction with a modified rear turn-around guide structure 758 (FIGURE 19 on sheet 8) which is the same as assembly 281 described herein except that guide 284 is permanently fixed as by brackets 760 to frame 223 or guide 223a with its document deflecting surface 652 extending parallel to surface 656 of guide 282.

Thus, when dial 481 is set to condition the printer for producing multiple copies, solenoid 434 is energized to swing flipper 310 to its dotted line position shown in FIGURE 2 as previously explained. A skew present in the traveling document in either direction is sensed by cells 670 and 672 to energize winding 706. As a result, flipper 310 is allowed to swing to its full-line, single copy position shown in FIGURE 2 to direct the skewed document onto tray 312 as it emerges from throat 280. Following the time delay determined by resistor 742, capacitor 754, relay 740 de-energizes to permit switch 756 to close for re-energizing solenoid 434, thereby swinging flipper 310 back to its multiple copy position. The ejected document now may be removed by the operator from tray 312 and re-fed through slot 30 to complete the production of the number of copies for which dial 481 was originally set.

Figure 20:
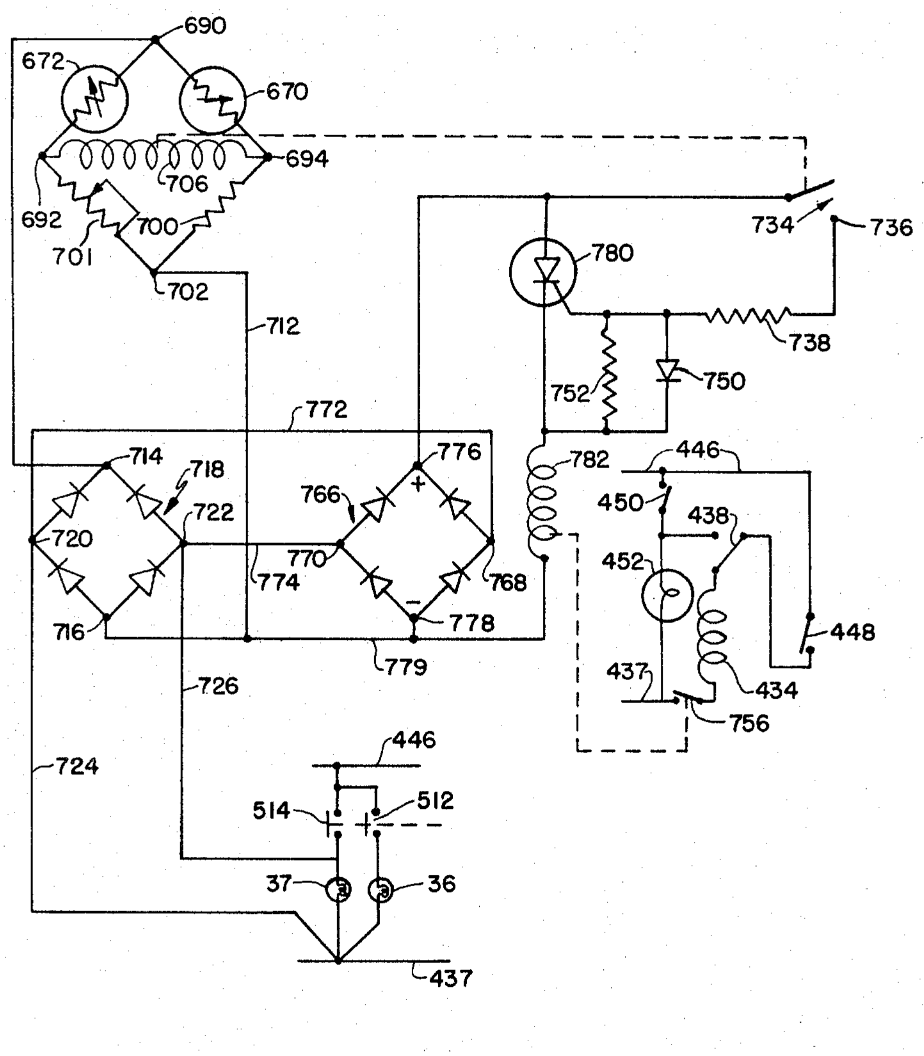
FIGURE 20 is a schematic diagram of a further document skew detecting circuit for ejecting the original document when its angle of skew exceeds a predetermined magnitude in either direction.

In FIGURE 20, a further circuit is shown for automatically ejecting a recycling document if it is skewed beyond an objectionable predetermined angle. To the extent that the circuitry illustrated in FIGURE 20 is the same as the circuit shown in FIGURE 18, like reference numerals have been used to designate like elements.

As shown in FIGURE 20, conductors 724 and 726 are respectively connected to the opposite terminals of exposure lamp 37 so that bridge circuit 718 is connected in parallel with lamps 36 and 37 for a purpose to be explained shortly. In parallel with bridge circuit 718 is a further full wave rectifier bridge circuit 766 having input terminals 768 and 770 respectively that are connected to terminals 720 and 722 by conductors 772 and 774.

With continued reference to FIGURE 20, the second bridge circuit 766 has a pair of output terminals 776 and 778 that are connected to supply operating power to SCR 780, and a relay having winding 782 and a movable contact 756. This relay is not a time delay relay, but instead remains energized concomitantly with the current conduction through SCR 780.

In operation of the circuit shown in FIGURE 20, cells 670 and 672 sense the skew of the traveling document in either direction in the manner previously explained to energize relay 706 when a circuit is completed for illuminating exposure lamp 37. By energizing winding 706, switch 734 is operated to complete a circuit for applying a firing voltage to the control electrode of SCR 780.

As a result of rendering SCR 780 conductive, relay winding 782 is energized to open switch 756 previously described to be in series with flipper solenoid 434. As a result, solenoid 434 is de-energized, allowing flipper 310 to swing back to its single copy position for ejecting the skewed, traveling document from its endless, recycling path and for directing it onto tray 312 in the manner already explained.

From the description of the control circuitry for illuminating exposure lamps 36 and 37, it is clear that contacts 514 are closed to energize relay 796 whenever relay 508 of FIGURE 9 (sheet 7) is energized. Relay 508, it will be recalled, is energized when the leading edge of the traveling document engages the actuators for switches 504 and 506 which are located in guide path 240 ahead of imaging station 33, and remains energized until the trailing edge of the copy paper clears the actuator of switch 520. At this time, the original document has emerged from throat 280 and traveled beyond flipper 310.

Accordingly, it is evident from the foregoing that an energizing circuit including SCR 780 for winding 782 is maintained for keeping flipper solenoid 434 from being energized until after the document has traveled under flipper 310 and onto tray 312. At this time, the copy paper has traveled sufficiently far to clear the actuator for switch 520. Since switches 504 and 506 have already opened at this stage of the copying operation, relay 508 will be de-energized to interrupt the energizing circuits for exposure lamps 36 and 37 and thus for the rectifier bridges in FIGURE 20. With no power applied to the rectifier bridges, SCR 780 becomes non-conductive and switch 754 closes to again complete a circuit for energizing the flipper solenoid 434 as previously explained.

Figure 21:
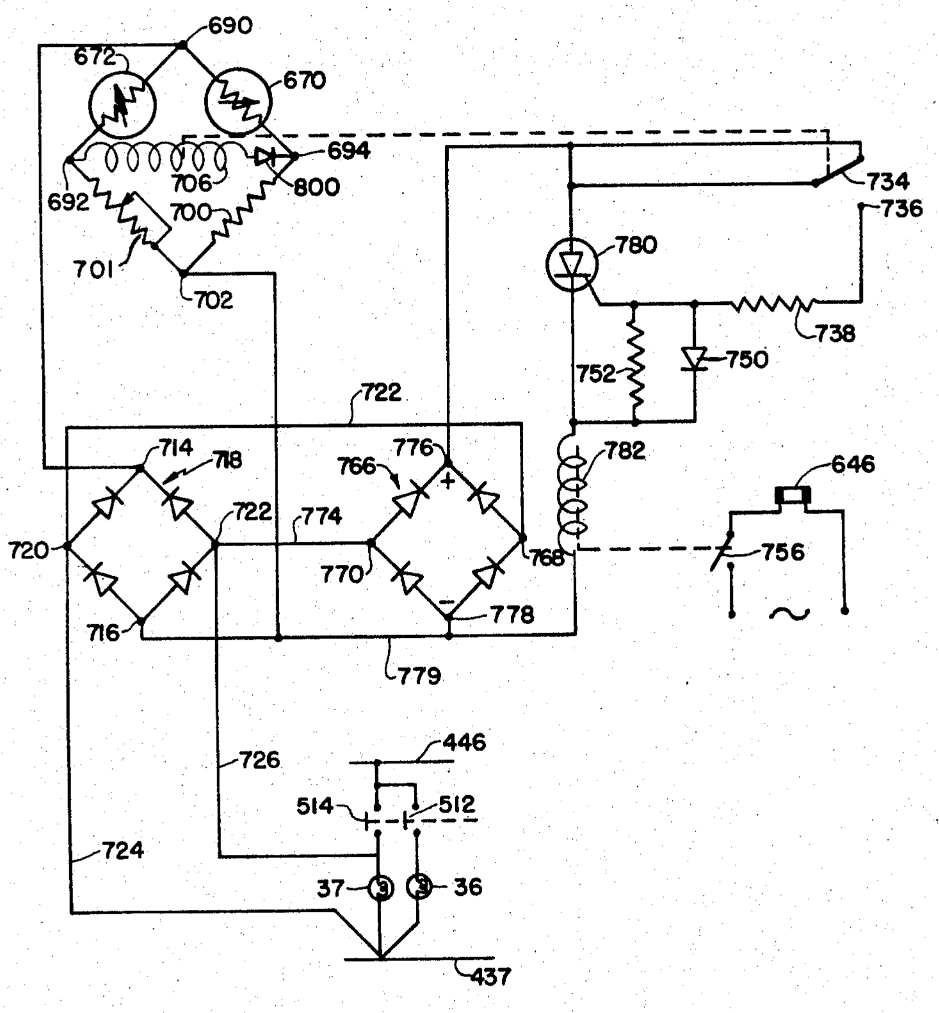
FIGURE 21 is a schematic diagram of another document skew and correcting circuit for adjusting the skew of the document traveling in its endless path within the printer.

FIGURE 21 illustrates a further circuit similar to the circuit shown in FIGURE 20 but capable of effecting a skew correcting operation by use of solenoid 646 as described in connection with the circuit of FIGURE 17. The circuit of FIGURE 21 is the same as that illustrated in FIGURE 20 except that a diode 800 has been added in series with winding 706 to thus make the system responsive to skew in one direction only, as was the circuit of FIGURE 17.

Like the circuit shown in FIGURE 20, SCR 780 in FIGURE 21 is energized with a unidirectional voltage from bridge 776 and thus remains in its conductive state once it has been fired by the energization of coil 706, so long as the operating voltage is applied. Bridge 776, as well as bridge 718 is energized from a circuit which is in parallel with exposure lamps 36 and 37. In normal operation of the printer relay contacts 512 and 514 open to thus remove the energizing voltage from bridge 766 after the copy sheet has advanced beyond its exposure station. By this time in the cycle of operation of the machine the document will have advanced sufficiently far so that the leading edge is beyond the nip of rollers 290 and 292 at the output end of turn around guide 284 which is shiftable by the energization of solenoid 246.

Figure 22:
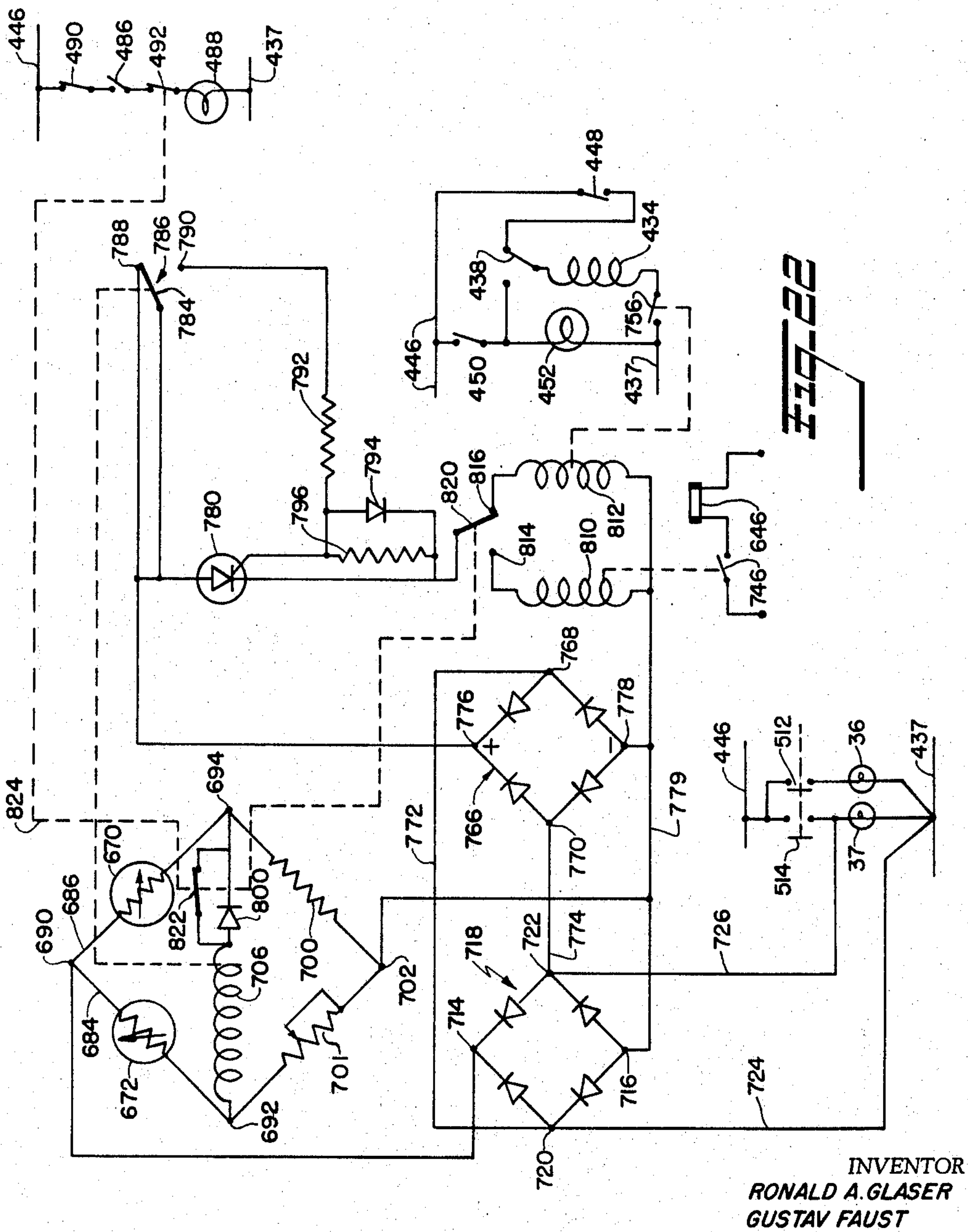
FIGURE 22 is a schematic diagram of still another document skew detecting and correcting circuit for adjusting the skew of the document as it travels in its endless path in the printer.

In FIGURE 22, the document rejection circuit of FIGURE 20 and the skew correction circuit of FIGURE 21 have been combined and modified so that upon detection of the document in a skewed condition, if during the first cycle the document will be automatically rejected by de-energization of flipper solenoid 434, and if during any subsequent cycle, the turn-around guide solenoid 646 will be energized to thereby correct the skewed condition of the document.

In the circuit shown in FIGURE 22, two separate relays having windings 810 and 812 are provided for alternately becoming energized when SCR 780 is energized. The terminals at corresponding ends of windings 810 and 812 are connected to one terminal of the power supply and the terminals at the opposite ends of the windings are connected to fixed contacts 816 and 814 of a switch having a movable contact 820. The movable contact is connected to one terminal of SCR 780.

Switch 746 associated with relay winding 810 is in series with the turn-around guide solenoid 646 while switch contact 756 is associated with relay winding 812 and adapted to open the circuit to flipper solenoid 434.

Movable switch contact 820 is mechanically linked to open and close concomitantly with switch 822 that bypasses diode 800 which is in series with relay winding 706 in the bridge circuit. When switch 822 is closed in its illustrated position, relay winding 706 is sensitive to skew in either direction. Therefore, when switch contact 820 is in a position as illustrated to cause energization of relay winding 812 when SCR 780 fires, contact 756 opens and causes the flipper solenoid to de-energize and the document to be ejected.

When switch contact 822 is open, diode 800 becomes operative to make relay coil 706 sensitive to skew in only one direction. Movable switch contact 820 is then transferred to fixed contact 814 and thus enables the winding 810 to be energized when the SCR 780 fires.

Movable switch contacts 820 and 822 may be linked together and adapted for concomitant operation with switch contact 492 which is shown in FIGURE 22 in its circuit in series with the feed lamp 488. The feed lamp circuit is shown also in FIGURE 9 on sheet 7; the mechanism for opening a contact of switch 492 is diagrammatically illustrated in FIGURE 10 on sheet 4.

With reference to FIGURE 10, it will be recalled that when knob 482 is rotated to a multiple copy position, lever 493 does not move notwithstanding the fact that the raised portion of cam surface 495 no longer abuts against lever 493 because of being held by latch 497. Switch 492 cannot open until stepper coil 472 is advanced at which time latch 497 is raised. Thus, if skew of the document is detected during the first cycle of operation, this has been caused by improper positioning of the document by the operator and flipper solenoid 434 will accordingly be de-energized and the document returned to the operator so that it can be re-inserted into the machine properly. On the other hand, if the document passes the first cycle of operation satisfactorily, and thereafter is detected to be objectionally skewed, movable switch contacts 820 and 822 will have been transferred so that the circuit acts as a correcting circuit in the same manner as described in connection with the circuit of FIGURE 21.

Figure 7:
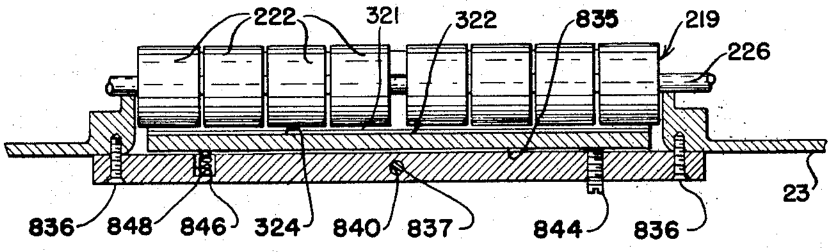
FIGURE 7 (on sheet 4) is a section taken substantially along lines 7—7 of FIGURE 4.

Referring now to FIGURES 4, 7, and 8, front turn-around guide 322 may be mounted for pivotal adjustment in a manner claimed and described in detail in the aforesaid copending application Ser. No. 366,268. This is a convenient way to provide for a manual adjustment of the desired skew in a particular direction that is to be imparted to the traveling document as it is recycled for producing multiple copies to enable use of the simplified corrective circuit described in connection with the circuits of FIGURES 17–22.

By the appropriate adjustment of the various components in the document feed path which effects the recycling of the document, it is possible to produce in the document a predetermined amount of skew in a particular direction for each cycle of operation. Therefore, assuming the document was placed in the machine in a substantially straight position, the document will have imparted to it sufficient skew so that upon completion of the second or third cycle of operation, the photocells will detect skew in a direction that will cause the SCR to fire and a correcting action to take place. The magnitude of change made to the skew position of the document is desirably two or three times the amount of skew necessary to cause actuation of the bridge circuit and firing of the SCR. Therefore, the document will be skewed slightly in the opposite direction for the next cycle and be substantially straight for the succeeding cycle. If additional copies are required, the document will again approach a skewed position which will cause the photocells to again actuate the bridge circuit, firing the SCR and adjusting the rear turn around guide 284. Accordingly, the present invention enables the original document to be recycled an unlimited number of times and in each in stance to move in proper timed relation with the copy sheet which is moved automatically by the machine.

Figure 23:
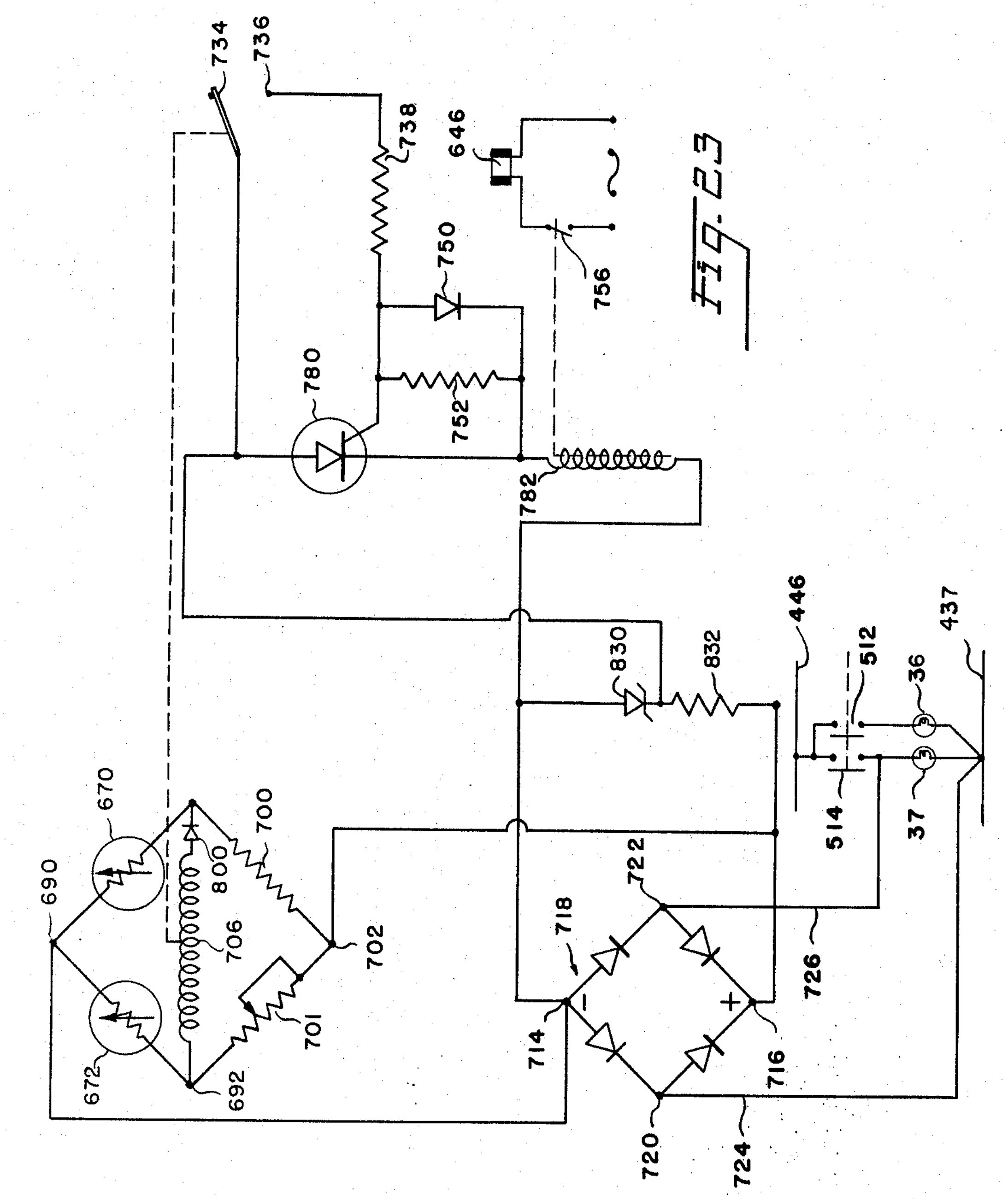
FIGURE 23 is a schematic diagram of still a further document skew detecting and correcting circuit for adjusting skew of the traveling document.

FIGURE 23 illustrates a further circuit which is the same as the circuit shown in FIGURE 21 except that bridge 766 has been omitted and a Zener diode 830 together with a resistor 832 have been added to the control circuit for advantageously regulating the output current of the circuit.

As shown in FIGURE 23, output terminals 714 and 716 of bridge circuit 718 are directly connected to supply operating power to SCR 780 and to relay winding 782. The cathode of diode 830 is connected through resistor 832 to terminal 716 of bridge circuit 718. The anode of diode 830 is connected to terminal 714 of bridge circuit 718. As a result, a current path is established through diode 830 in parallel relation with the current path through SCR 780 and winding 782.

Characteristic of Zener diodes, the voltage across diode 830 is maintained very nearly constant for any current within its operating range. As a result, diode 830 acts as a voltage reference element to regulate the output voltage of circuit 718.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A duplicating machine having a duplicating station, means for cyclically routing a document to be copied through an exposure zone in said duplicating station, means for feeding copy paper seriatim through said duplicating station in timed relation with the movement of said document therethrough to transfer an image on the document to said copy paper as it passes through said duplicating station, and characterized by means responsive to a predetermined skewed orientation of said moving document relative to its direction of travel for automatically imparting a predetermined different movement to said document than would otherwise occur.

2. A duplicating machine as defined in claim 1 wherein said last mentioned means comprises detecting means for sensing the angle of skew of said document relative to its direction of travel and means actuated by said detecting means for automatically imparting said predetermined different movement to said document upon the sensing of a predetermined angle of skew.

3. The duplicating machine defined in claim 2 further comprising means providing an endless path through which said document is cyclically routed for producing multiple copies and means for optionally ejecting the travelling document from said endless path, and wherein said means for imparting said predetermined movement to said document actuates said document ejecting means.

4. The duplicating machine as defined in claim 3 wherein the document guide path comprises spaced rollers across which the document bridges as it moves through turn around regions for substantially reversing the direction of document movement, and wherein the predetermined movement imparted to the document is effected at one of said turn around regions to controllably alter the orientation of skew of said document.

5. The duplicating machine as defined in claim 4 wherein said one of said turn around regions comprises a deflector against which a surface of the document is slid as it moves along its route and wherein means are provided for mounting said deflector for pivotal movement about an axis to impart said predetermined movement to said document.

6. The duplicating machine as defined in claim 5 wherein the said deflector is pivotal to correct the orientation of skew of said document in one direction only and wherein the document routing means effects a predetermined amount of skew only in a direction opposite to the direction of skew correction effected by pivoting said deflector, the predetermined amount of skew produced by said document routing means being added to the orientation of the document for each cycle of operation.

7. The duplicating machine as defined in claim 2 wherein the detecting means comprises a pair of photocells fixedly mounted to detect the position of the leading edge of the document and operable to produce an output signal in response to a skewed orientation of said document, and an electronic circuit including a solenoid responsive to the photocell output signal for imparting said predetermined different movement to said document, and means de-energizing said circuit during each routing cycle of the original.

8. The duplicating machine defined in claim 2 wherein said means actuated by said detecting means comprises means for re-orienting said document to change said skew angle upon the sensing of a predetermined angle of skew.

9. The duplicating machine as defined in claim 8 wherein the document routing means effects a predetermined amount of skew in a first direction to said document for each cycle of operation, and wherein the skew angle changing means, when actuated, effects a skew in opposite direction to said document.

10. The duplicating machine as defined in claim 9 wherein the detecting means comprises a pair of photocells fixedly mounted to detect the position of the leading edge of the document and operable to produce an output signal in response to a skewed orientation of said document, and an electronic circuit including a solenoid connected to be energized by the output signal from said photocells and subsequently de-energized during each routing cycle of the document, said solenoid being mechanically connected to actuate said skew angle changing means.

11. The duplicating mcahine defined in claim 2 wherein said means for cyclically routing said document through said exposure zone comprises means defining an endless path passing through said zone, and wherein said means for imparting said predetermined movement to said document comprises first means actuated by said detecting means only before said document is cycled a second time through said exposure zone to thereby eject said document from said endless path and a second means actuated by said detecting means only after said document is cycled a second time through said exposure zone to thereby re-orient said travelling document to change said skew angle.

12. The duplicating machine defined in claim 2, wherein said detecting means comprises a bridge circuit having a pair of input terminals and a pair of output terminals, a pair of condition-responsive elements disposed in separate branches of said bridge circuit to cause an unbalanced condition of said bridge circuit when said document is skewed in a direction other than a straight oriented position where its leading edge extends substantially normal to the direction of document movement, a source of operating voltage connected across said input terminals, an electronic circuit connected to be selectively energized by the signal from said bridge output terminals in response to skewed document condition in at least one direction, a displaceable document engaging part for imparting said predetermined movement to said document, and a solenoid connected when the electronic circuit is energized by a signal from said bridge circuit to move said displaceable document engaging part.

13. The duplicating machine defined in claim 12 wherein said detecting means further comprises a branch circuit having a relay connected across said bridge output terminals, and a blocking diode connected in said branch circuit to permit said relay to be energized only in response to a document skew in one predetermined direction, said electronic circuit being connected to be energized through contacts on said relay.

14. The duplicating machine defined in claim 12 wherein said detecting means further comprises a branch circuit having a first relay connected across said bridge output terminals and wherein said electronic circuit includes an electronically controlled switch connected to be rendered conductive through contacts on said first relay, and a second relay connected in series with said electronically controlled switch to be energized when said electronically controlled switch is rendered conductive, said solenoid being connected to be energized through contacts on said second relay.

15. The duplicating machine defined in claim 14 wherein the operating voltage is an alternating voltage, said electronically controlled switch is a silicon controlled rectifier and said electronic circuit further comprises time delay means for maintaining said second relay energized for a predetermined period after said silicon controlled rectifier is rendered non-conductive.

16. The duplicating machine defined in claim 14 wherein said electronically controlled switch comprises a silicon controlled rectifier connected across said source of operating voltage and wherein said electronic circuit further comprises a voltage regulating circuit having a Zener diode connected across said source in parallel with said silicon controlled rectifier.

17. The duplicating machine defined in claim 2 wherein said detecting means comprises a bridge circuit having a pair of input terminals and a pair of output terminals, a pair of radiation sensitive cells disposed in separate legs of said bridge circuit to cause an unbalanced condition of said bridge circuit when said document is skewed in a direction other than a straight, oriented position where its leading edge extends substantially normal to the direction of document movement, means providing a source of operating voltage connected across said input terminals, a document engaging part displaceable to impart said predetermined movement to said document, and means responsive to a predetermined unbalanced condition of said bridge circuit at the output terminals of said bridge circuit for displacing said part.

18. The duplicating machine defined in claim 17 comprising means including a source of radiation for projecting an image of said document on to said paper passing through said duplicating station, switch means actuated by said traveling document and said copy paper for connecting said radiation source together with said bridge circuit across said source to simultaneously energize and de-energize said bridge circuit and said radiation source.

19. The duplicating machine as defined in claim 18 wherein radiation from said radiation source is used to illuminate said radiation sensitive cells.

20. In a duplicating machine, a duplicating station, guide means defining an endless path for cyclically routing a document to be copied through an exposure station in said duplicating station, means for moving said document along said path and for feeding and plurality of sheets of copy paper seriatim through said duplicating station in timed relation with the movement of said document therethrough, means at said duplicating station for transferring an image on said document to said sheets of copy paper as they are fed through said duplicating station, deflector means forming a part of said guide means for changing the direction of said document after it passes through said station, means mounting said deflector for angular displacement, detecting means for sensing the angle of skew of said document relative to its direction of travel along said endless path, and means actuated by said detecting means for changing the orientation of skew of said document upon the sensing of a predetermined angle of skew.

21. In a duplicating machine, a duplicating station, guide means defining an endless path for cycling routing a document to be copied through an exposure zone in said duplication station, means for moving said document along said path, and for feeding a plurality of sheets of copy paper seriatim through said duplicating station in timed relation with the movement of said document therethrough, means at said duplicating station for transferring an image on said document to said sheets of copy paper as they are fed through said duplicating station, detecting means for sensing the angle of skew of said moving document relative to its direction of travel, and gate means actuatable by said detecting means for automatically ejecting the traveling document from said endless path upon the sensing of a predetermined angle of skew.

22. An apparatus for automatically imparting a predetermined movement to a cut sheet of paper having a leading edge traveling along a predetermined path perpendicular to the direction of the leading edge, said apparatus comprising detecting means for sensing the angle of skew of the leading edge of said traveling paper relative to its direction of movement along said path, and means actuated by said detecting means for automatically imparting a predetermined movement to said paper upon the sensing of a predetermined angle of skew.

23. The apparatus defined in claim 22 wherein said means actuated by said detecting means comprises a displaceable paper engaging part, said detecting means comprising a bridge circuit having a pair of input terminals and a pair of output terminals, means providing a source of operating voltage connected across said input terminals, a pair of radiation sensitive elements disposed in separate legs of said bridge circuit to cause an unbalanced condition of said bridge circuit when said paper is skewed in at least one direction from a straight oriented position where its leading edge extends substantially normal to the direction of paper movement, and means responsive to a signal from said bridge circuit for so displacing said part as to impart said predetermined movement to said paper.

24. The apparatus defined in claim 23 wherein said detecting means further comprises means providing at least one source of radiation for said radiation sensitive elements, said radiation sensitive elements being spaced laterally across the path of said paper, and means mounting said radiation source and said radiation sensitive elements respectively on opposite sides of said path whereby movement of said paper along said path blocks the radiation from said radiation source directed at said radiation sensitive cells.

25. In a duplicating machine having a duplicating station, drive and guide components for cyclically routing a document to be copied along an endless path passing through an exposure zone at said station and being capable of imparting an objectionable skew to the moving document relative to its direction of travel along said path, and means for feeding copy paper through said duplicating station in timed relation with the advancement of said document through said exposure zone to enable the transfer of an image from said document to said copy paper as said document and copy paper respectively pass through said zone and said station, the improvement comprising means responsive to a predetermined skew orientation of said moving document relative to its direction of travel along said endless path for altering the skew orientation of the document in such a direction as to counteract any objectionable skew which may be imparted to the document during its advancement along said path.

References Cited

UNITED STATES PATENTS

| | | | |
|---|---|---|---|
| 3,181,418 | 5/1965 | Durlofsky | 88—24 |
| 3,196,767 | 7/1965 | Eichorn | 88—24 X |

NORTON ANSHER, *Primary Examiner.*

R. WINTERCORN, *Assistant Examiner.*

UNITED STATES PATENT OFFICE

CERTIFICATE OF CORRECTION

Patent No. 3,343,450 September 26, 1967

Ronald A. Glaser et al.

It is hereby certified that error appears in the above numbered patent requiring correction and that the said Letters Patent should read as corrected below.

In the drawings, "Fig. 2" upper left corner, strike out "422"; same Fig. 2, at the left side of the figure, for switch "604" read -- 504 --; Fig. 3, strike out the numeral "126" without the lead line at rear of copy paper stack 25; same Fig. 3, strike out "294" without lead line to the right rear turn-around guide 281; Fig. 9, in the approximate center of the figure for "420" read -- 412 --; column 5, line 3, for "is" read -- in --; line 26, for "driven" read -- drive --; column 7, line 16, for "Rollers" read -- Roller --; column 10, line 22, for "48" read -- 248 --; column 11, line 62, for "slidably" read -- slidable --; column 13, line 48, strike out "then"; column 15, line 43, after "picked" insert -- up --; column 16, line 72, strike out "430"; column 17, line 9, after "copy" insert -- paper --; column 19, line 70, for "respecively" read -- respectively --; column 24, line 18, for "objectionally" read -- objectionably --; line 53, for "in stance" read -- instance --; column 26, line 18, for "mcahine" read -- machine --; column 27, line 37, for "feeding and" read -- feeding a --; line 53, for "cycling" read -- cyclically --; line 55, for "duplication" read -- duplicating --.

Signed and sealed this 26th day of November 1968.

(SEAL)
Attest:

EDWARD M. FLETCHER, JR.
Attesting Officer

EDWARD J. BRENNER
Commissioner of Patents